US007352274B2

(12) United States Patent
Omata et al.

(10) Patent No.: US 7,352,274 B2
(45) Date of Patent: Apr. 1, 2008

(54) REMOTE KEYLESS ENTRY SYSTEM

(75) Inventors: Takashi Omata, Ayase (JP); Noriharu Sato, Tokyo (JP); Shiro Horii, Hitachinaka (JP); Toshio Nagashima, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 390 days.

(21) Appl. No.: 10/601,664

(22) Filed: Jun. 24, 2003

(65) Prior Publication Data

US 2004/0036625 A1 Feb. 26, 2004

Related U.S. Application Data

(63) Continuation of application No. 09/351,130, filed on Jul. 12, 1999, now Pat. No. 6,624,758.

(30) Foreign Application Priority Data

| | | |
|---|---|---|
| Jul. 13, 1998 | (JP) | 10-196961 |
| Aug. 20, 1998 | (JP) | 10-233826 |
| Sep. 9, 1998 | (JP) | 10-255484 |

(51) Int. Cl.
*G06F 7/00* (2006.01)
*H04B 1/00* (2006.01)
*G08C 19/00* (2006.01)
*H01H 47/22* (2006.01)

(52) U.S. Cl. .................... 340/5.72; 307/10.2; 455/63.1

(58) Field of Classification Search ............... 307/10.2; 340/5.72; 455/63.1
See application file for complete search history.

(56) References Cited

U.S. PATENT DOCUMENTS 5,450,438 A * 9/1995 Landry et al. .............. 375/222
5,471,519 A * 11/1995 Howe et al. ............. 379/88.26
5,483,676 A 1/1996 Mahany et al.
5,874,903 A 2/1999 Shuey et al.
5,937,065 A 8/1999 Simon et al.
6,108,560 A * 8/2000 Navaro et al. .............. 455/517
6,323,566 B1 * 11/2001 Meier ........................ 307/10.2
6,624,758 B1 * 9/2003 Omata et al. .......... 340/426.36

FOREIGN PATENT DOCUMENTS

| | | |
|---|---|---|
| JP | 2-288592 | 11/1990 |
| JP | 4-213676 | 8/1992 |
| JP | 04-315684 | 11/1992 |
| JP | 05-301561 | 11/1993 |

(Continued)

*Primary Examiner*—Michael Sherry
*Assistant Examiner*—Dru Parries
(74) *Attorney, Agent, or Firm*—Antonelli, Terry, Stout & Kraus, LLP.

(57) ABSTRACT

An easy-to-use remote keyless entry system is provided. To execute 2-way long distance communication at a low output and within a short time, transmission is effected while a data rate of a terminal board is changed. To reduce battery consumption in a system capable of setting an automatic output mode, the operation mode is shifted to the automatic output mode when an automatic output mode button is pushed or when a door lock release button of an operation button, etc, is kept pushed for a predetermined time. To execute a reserved operation at a reserved time, a storage circuit for storing reservation is provided to the terminal board.

11 Claims, 25 Drawing Sheets

FOREIGN PATENT DOCUMENTS

| | | |
|---|---|---|
| JP | 6-58029 | 3/1994 |
| JP | 06-326691 | 11/1994 |
| JP | 7-109859 | 4/1995 |
| JP | 7-305546 | 11/1995 |
| JP | 8-23588 | 1/1996 |
| JP | 08-251377 | 9/1996 |
| JP | 08-284505 | 10/1996 |
| JP | 9-132114 | 5/1997 |
| JP | 09-209630 | 8/1997 |
| JP | 10-211868 | 8/1998 |

* cited by examiner

REMOTE KEYLESS ENTRY SYSTEM

CROSS-REFERENCE TO RELATED APPLICATIONS

This is a continuation of U.S. application Ser. No. 09/351,130 filed 12 Jul. 1999, now U.S. Pat. No. 6,624,758 B1.

BACKGROUND OF THE INVENTION

This invention relates to a remote keyless entry system.

JP-A-8-284505 (hereinafter called the "reference 1") describes a remote keyless entry system that executes 2-way communications, sends to an operation apparatus side a notice representing whether or not the operation is executed, and sends the report to a user. However, this reference does not describe a transfer data rate. Therefore, the reference does not take into account the decreasing of a communication distance in 2-way communications when it utilizes a weak radio wave. In other words, when communications fail at a place of a certain distance in the known reference 1, the operator must come into the range of the communication distance and must once again try communications.

JP-A-9-209630 (hereinafter called the "reference 2") describes another remote keyless entry system. A portable transmitter of this system intermittently generates a radio wave modulated by an identification code, and when the user having the portable transmitter walks up to a car, a receiver mounted to the car receives the radio wave and releases the door lock when the identification code is correct. A time zone in which the portable transmitter automatically emits the radio wave for releasing the door lock can be set in order to minimize battery consumption.

Though the reference 2 limits the automatic transmission time zone, the transmitter executes an automatic output operation in a predetermined time zone either daily or on predetermined days of the week. Therefore, battery consumption is greater than when this automatic transmission operation is not made. Originally, a driver of a car desires to make the automatic door lock when the driver walks up to the car while holding things with his or her both hands and cannot take out a terminal board kept in the pocket, or when the driver approaches the car with an umbrella spread. Usually, when the driver returns to the car while holding things with both hands or with an umbrella spread, it does not take a long time before he reaches the car, and it is only five to 10 minutes, or about 60 minutes or so, at the longest. Therefore, it is not economical from the aspect of battery consumption to execute the automatic output operation in the predetermined time zone as is made in the reference 2.

JP-A-4-315684 (hereinafter called the "reference 3") describes a remote keyless entry system in which a display is provided to a terminal board to display the state of a car. The driver of the car always keeps the key, and although the display is provided to the terminal board of the remote keyless entry system, the driver cannot confirm the time when he desires to check the time. Even when the time for operating the engine is determined in advance, the driver must take the trouble in walking up to the location of the car to start the engine.

SUMMARY OF THE INVENTION

It is an object of the present invention to provide a novel and improved remote keyless entry system.

It is the first object of the present invention to provide a keyless entry system that can be operated even when an operator does not move into a communication distance range. To accomplish this object, a data generation circuit having different data rates and a selection circuit of transmission data are provided to a terminal board so that the data transfer rate can be changed when long distance communication is necessary. This data generation circuit executes transmission of a high-speed data rate at first. When no response to the high-speed data is received, the data generation circuit again executes transmission by switching the data rate.

It is the second object of the present invention to provide a remote keyless entry system that can be operated even when both hands of an operator or a driver are full, minimizes battery consumption and reduces the frequency of the battery exchange. To accomplish this object, an automatic output operation button and an automatic output time setting circuit are provided to a terminal board, and a transmission circuit capable of automatic transmission for a predetermined time from a set operation is further provided. The automatic output time setting circuit sets the time at which an automatic output operation is made. The automatic output operation button executes activation of the automatic output operation. The terminal board conducts the automatic output operation from the point of time at which the activation operation is effected, and then stops its operation. When the driver approaches the car within the set time, door lock of the car is released without the door lock release operation.

It is the third object of the present invention to provide a remote keyless entry system that makes it possible to confirm the time by a terminal board. To accomplish this object, a timepiece circuit is provided to a terminal board comprising an operation button and a communication circuit. The terminal board is so controlled as to execute an operation content set in advance, at a predetermined time.

BRIEF DESCRIPTION OF THE DRAWINGS

These and other features, objects and advantages of the present invention will become more apparent from the following description when taken in conjunction with the accompanying drawings, wherein.

DESCRIPTION OF THE EMBODIMENTS

Hereinafter, preferred embodiments of the present invention will be explained with reference to the accompanying drawings.

To begin with, a remote keyless entry system will be explained as a whole.

Figure 1:
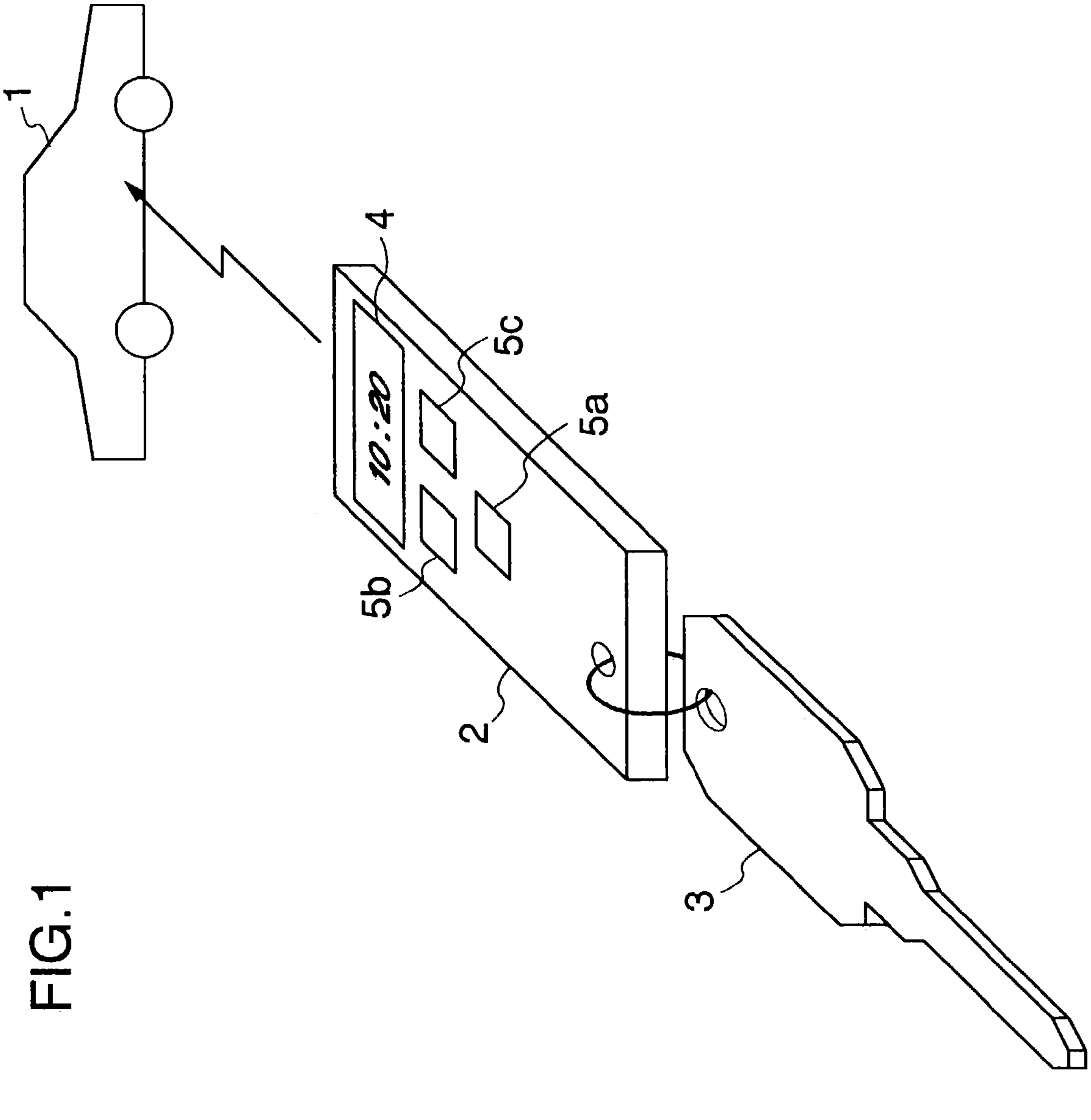
FIG. 1 is a schematic view showing the appearance of a remote keyless entry system.

FIG. 1 is a schematic view showing the appearance of the remote keyless entry system as a whole. Reference numeral 1 denotes a car which is one of equipment controlled by a remote control device according to the present invention. The controlled equipment include gates of garage, house and parking lot and so on other than a door of a car. We will hereinafter explain the present invention by referring to the remote entry to the far door as one of the examples. Reference numeral 2 denotes a terminal board, reference numeral 3 denotes a key, reference numeral 4 denotes a display and reference numerals 5*a* to 5*c* denote operation buttons. In the operation button 5, which are the parts of operation circuit, reference numeral 5*a* denotes an object to be operated such as the trunk or doors of the car, and the operation object may be varied whenever the operation button 5*a* is pushed. It is also possible to employ the construction in which the operation button 5*a* decides the operation object, the operation object so decided is displayed on the display and the operation or manipulation content is indicated by the operation buttons 5*b* and 5*c*.

Next, the operation will be explained. Generally, when the operation button 5 (such as a door lock release button) is pushed, the terminal board 2 transfers a signal for operating the function corresponding to the input of the operation button 5 (door lock release, for example) to the car 1. An operation apparatus inclusive of a reception circuit is mounted to the car 1, receives the signal from the terminal board 2 and executes designated operations. An example of such designated operations is the locking/unlocking operation of the door lock of the car. Characters “LOCK” and “UNLOCK”, illustration or symbols, are put to the operation buttons 5*b* and 5*c*. This explanation deals with the normal manual operation, and the driver must operate the operation button 5 of the operation board 2 within the communicable range.

Next, the construction of the operation apparatus mounted to each of the terminal board 2 and the car, and its operation, will be explained with reference to FIG. 2.

Figure 2:
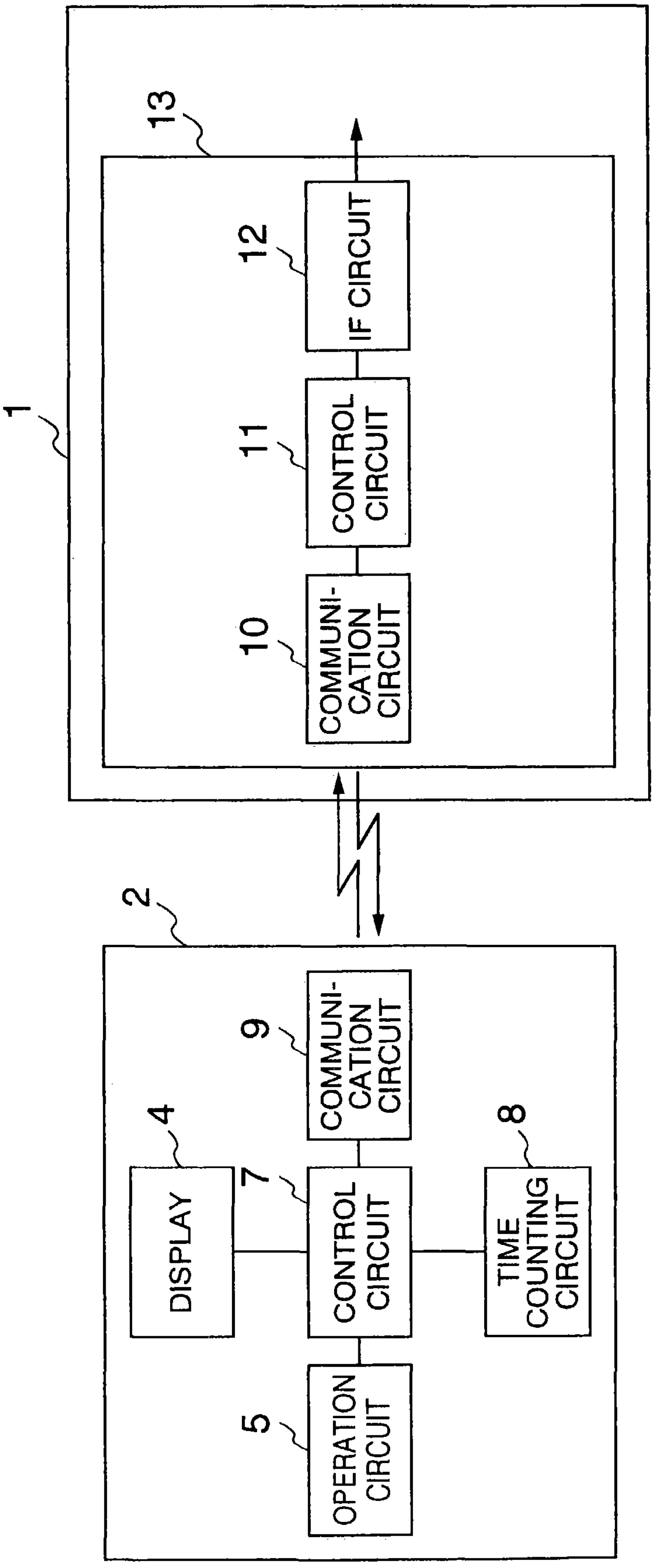
FIG. 2 is a block diagram showing a remote keyless entry system according to one embodiment.

FIG. 2 is a block diagram showing the schematic construction of this embodiment. Reference numeral 7 denotes a control circuit, reference numeral 8 denotes a time counting circuit, reference numerals 9 and 10 denote communication circuits, reference numeral 11 denotes a control circuit, reference numeral 12 denotes an interface circuit (hereinafter called the “IF circuit”) and reference numeral 13 denotes an operation apparatus. In FIG. 2, the same reference numerals denote the same constituent components having the same function and executing the same operation as those shown in FIG. 1. Further, like reference numerals will be used in the subsequent drawings of this specification to identify like constituent components having the same function and executing the same operation. When the driver gives an instruction operation to release the door lock through the operation button 5, for example, the operation button 5 sends this instruction to the control circuit 7. The control circuit 7 generates an operation instruction signal (door lock release instruction signal, for example) and sends it to the communication circuit 9. Receiving this instruction from the control circuit 7, the communication circuit 9 executes the communication operation to the operation apparatus 13. Generally, this communication employs communication by infrared rays or radio waves.

The communication circuit 10 inside the operation apparatus 13 receives the signal from the communication circuit 9 and sends the instruction from the terminal board 2 (door lock release instruction, for example) to the control circuit 11.

The control circuit 11 decodes the requested function from the communication signal so transferred, and sends the decoded content to the IF circuit 12.

The IF circuit 12 is connected to an internal communication network inside the car 1, converts the signal of the requested function from the control circuit 11 to a signal of the internal communication network and sends it to the internal communication network. When the door lock release signal is sent as the request signal, the car detects the door lock release signal of the internal communication network and releases the door lock.

Signal exchange between the terminal board 2 and the operation apparatus 13 will be explained with reference to FIG. 3.

Figure 3:
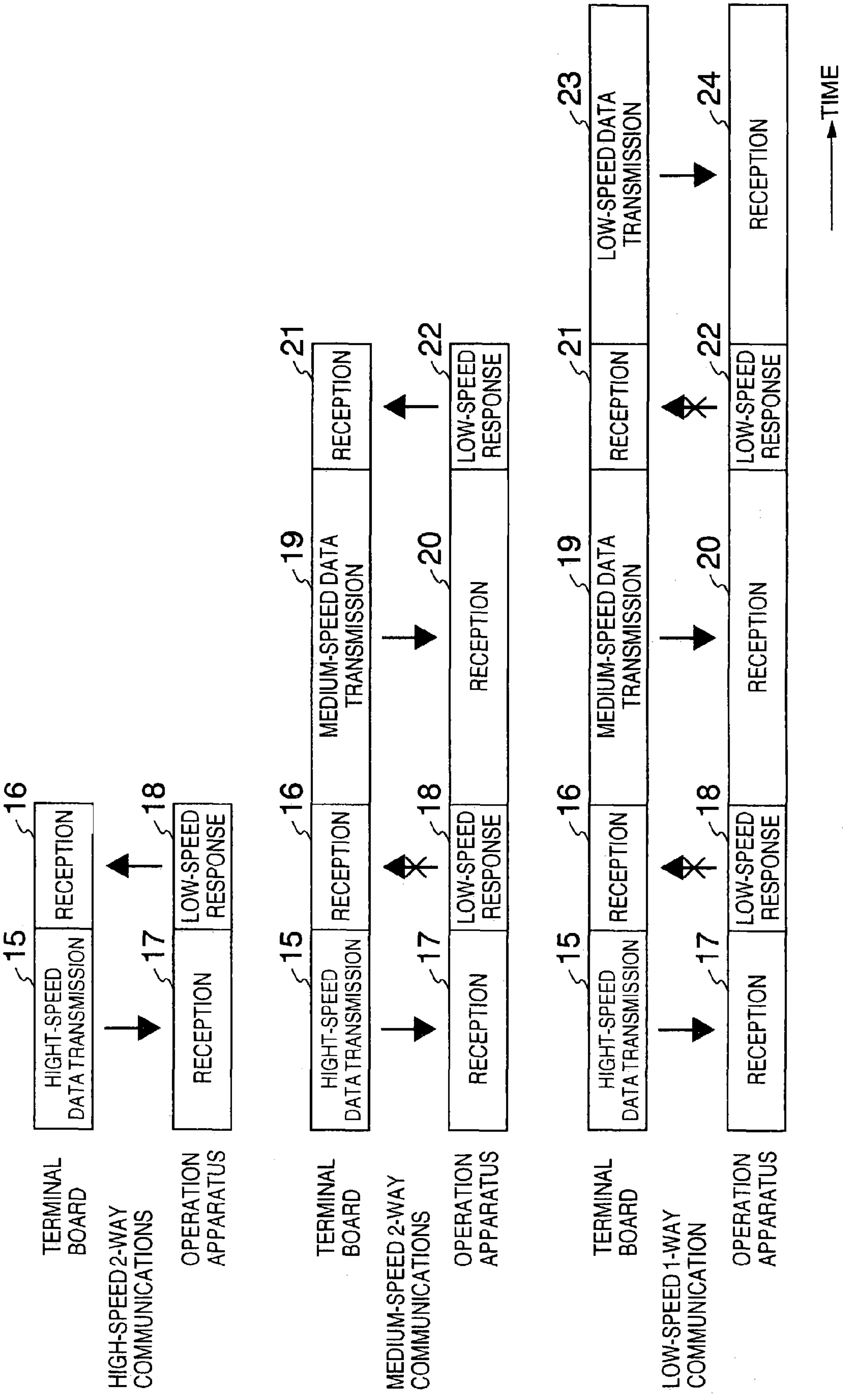
FIG. 3 is a timing chart showing the communication timings of a terminal board and an operation apparatus.

FIG. 3 is a timing chart showing the signal exchange between the terminal board 2 and the operation apparatus 13. It is the characterizing feature of the protocol shown in FIG. 3 that the coverage of a longer distance is accomplished by reducing in regular order the data transfer rate. It is another characterizing feature of the protocol that long distance signal transfer is accomplished eventually as 1-way communication. It is still another feature that the operation apparatus makes its response by low rate data for the following reason. Namely, because the terminal board is smaller in size and has a lower data reception capacity than the operation apparatus, the terminal board is likely to fail to receive the data if the data transfer is executed at a high transfer rate.

Referring to FIG. 3, the uppermost stage represents a timing chart that shows the operation of the terminal board and the operation apparatus in high-speed 2-way communication that is made in a closer range. The middle stage represents a timing chart showing the operation of the terminal board and the operation apparatus in medium speed 2-way communication that is made in a medium range. The lower stage represents a timing chart showing the operation of the terminal board and the operation apparatus in low-speed 1-way communication that is made in a long range. In FIG. 3, reference numeral 15 denotes high-speed data transmission, reference numeral 17 denotes reception of high-speed data transmission 15, reference numeral 18 denotes low-speed response to high-speed data transmission, reference numeral 19 denotes medium-speed data transmission, reference numeral 20 denotes reception of medium-speed data transmission 19, reference numeral 22 denotes low-speed response to medium-speed data transmission 19, reference numeral 21 denotes reception of low-speed response 22, reference numeral 23 denotes low-speed data transmission and reference numeral 24 denotes reception of low-speed data transmission 23. Generally, when the transfer rate is lowered in digital data transfer, the data transfer time becomes longer but the transfer distance becomes greater.

First, high-speed data transmission 15 is executed from the side of the terminal board 2. The operation apparatus 13 receives (17) this high-speed data transmission 15. The operation apparatus 13 executes a predetermined operation when it can correctly receive the high-speed data transmission 15 and transmits the low-speed response 18. The terminal board 2 receives (16) the low-speed response 18 from the operation apparatus. When a series of these operations are completed smoothly and without problem, the operation of the system is completed.

When the terminal board 2 fails to receive the low-speed response 18 to the high-speed data transmission 15 from the operation apparatus 13, or when it receives the low-speed response 18 representing that the high-speed data transmission 15 cannot be received correctly, the terminal board 2 then transmits the medium-speed data transmission 19. The operation apparatus 13 receives (20) this medium-speed data transmission 19 and transmits the low-speed response 22. The terminal board 2 receives (21) the low-speed response 22. When a series of these operations are completed smoothly and without trouble, the system operation is completed.

When the medium-data transfer cannot be received correctly, the terminal board further executes the low-speed data transmission 23. The operation apparatus 13 receives (24) the low-speed data transmission 23. When the operation apparatus 13 correctly receives (24) the low-speed data transmission 23, the low-speed response may be effected. Generally, however, when transmission is made at the same output, the reception antenna gain is small because the terminal board 2 is small in capacity, and often fails to receive the signal from the operation apparatus 13.

The operation flow of each of the terminal board 2 and the operation apparatus 13 shown in FIG. 3 will be explained with reference to FIG. 4. The left side of FIG. 3 shows the operation flow of the terminal board 2 and the right side does the operation flow of the operation apparatus 13.

Figure 4:
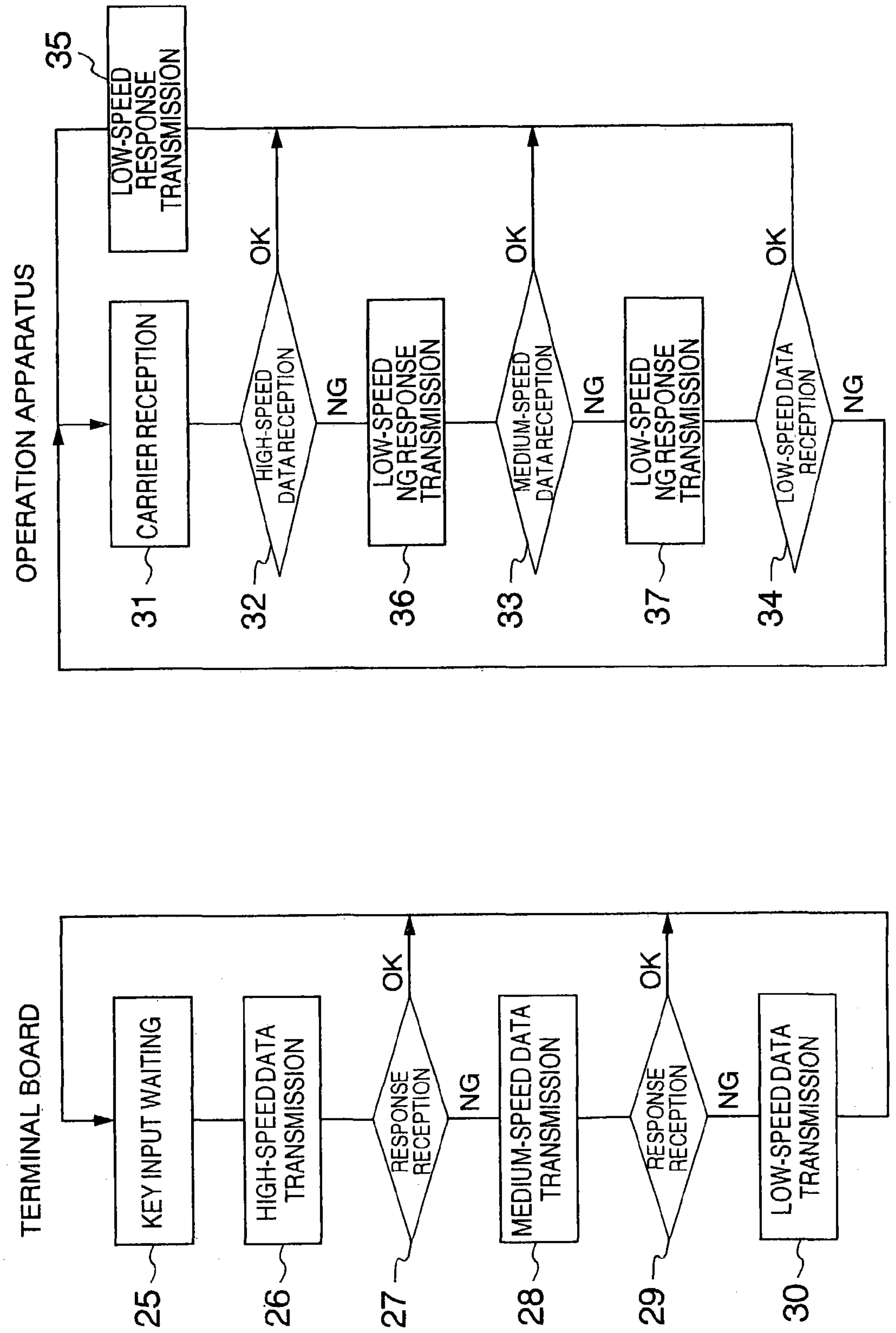
FIG. 4 is a flowchart showing the operations of the terminal board and the operation apparatus.

In FIG. 4, reference numeral 25 denotes a key (operation button) input waiting state, reference numeral 26 denotes high-speed data transmission, reference numerals 27 and 29 denote response reception, reference numeral 28 denotes medium-speed data transmission, reference numeral 30 denotes low-speed data transmission, reference numeral 31 denotes carrier reception, reference numeral 32 denotes high-speed data reception, reference numeral 33 denotes medium-speed data reception, reference numeral 34 denotes low-speed data reception, reference numeral 35 denotes low-speed response transmission, and reference numerals 36 and 37 denote low-speed NG response transmission. The term NG is abbreviation of “no good” that indicates an error or a failed event. The NG response means that the operation apparatus does not receive proper signal from the terminal board.

The operation flow of the terminal board 2 will be explained first. The terminal board 2 is on standby under the normal key input waiting state from the operator. When the key input from the operator is given, it executes high-speed data transmission 26. This high-speed data transmission 26 includes at the first part thereof a carrier transmission for waking up the operation apparatus 13. When high-speed data transmission 26 is completed, response reception 27 from the operation apparatus 13 is executed. The operation is completed if the reception proves OK in response reception 27 to high-speed data transmission 26, and the terminal board returns again to the key input waiting state 25. When the response signal indicating the NG is received in response reception 27 or when no response signal is received within a set time, medium-speed data transmission 28 is executed. After medium-speed data transmission 28 is made, response reception 29 to medium-speed data transmission 28 is executed.

When this response reception proves OK in the same way as response reception 27 to high-speed data transmission 26, the operation is completed and the terminal board 2 returns to the key input waiting state 25. When response reception 29 to medium-speed data transmission 28 proves NG, low-speed data transmission 30 is executed in turn. Response reception to low-speed data transmission 30 may be executed but this response reception is not shown in FIG. 4 because the terminal board 2 is small in capacity and has therefore a low reception antenna gain, and often fails to receive signal transmission from the operation apparatus 13. When the notice of the operation confirmation is made by the terminal board 2, response reception to low-speed data transmission may be made as a part of the operation flow of the operation board 2.

Next, the operation flow of the operation apparatus 13 will be explained. The operation apparatus is generally on standby at carrier reception 31. When the carrier is sent prior to high-speed data transmission from the terminal board 2, the operation apparatus is woken up as a whole.

Next, the operation apparatus 13 executes high-speed data transmission 32. When this high-speed data reception 32 is executed correctly, the operation apparatus 13 executes low-speed response transmission 35 and is again on standby under the carrier reception waiting state 31.

When any deficiency of the reception content exists in high-speed data reception or when any falloff of data exists, or when the high-speed data cannot be received within the reception time, the low-speed NG response 36 is transmitted and the operation shifts to medium-speed data reception 33. When reception proves OK in this medium-speed data reception 33, the operation apparatus 13 executes low-speed response transmission 35, proceeds to carrier reception 31 and enters the standby state.

When any deficiency of the reception content or any falloff of the data exists in medium-speed data reception, or when the medium speed data cannot be received within the reception time, the operation apparatus transmits the low-speed NG response 37 and proceeds to low-speed data reception 34. When reception proves OK in this low-speed data reception 34, too, the operation apparatus 13 executes low-speed response transmission 35, proceeds to carrier reception 31 and enters the standby state. When any deficiency of the reception content or any falloff of the data exists in low-speed data reception or when the low speed data cannot be received within the reception time, the operation apparatus 13 proceeds to carrier reception 31 while transmitting, or without transmitting, the low-speed NG response (not shown in FIG. 4).

The data transfer rate is serially lowered by the operation flow described above so as to make it possible to achieve serially communication of a longer distance. In this case, the communication time becomes serially longer though the data transfer of a longer distance can be made serially.

Figure 5:
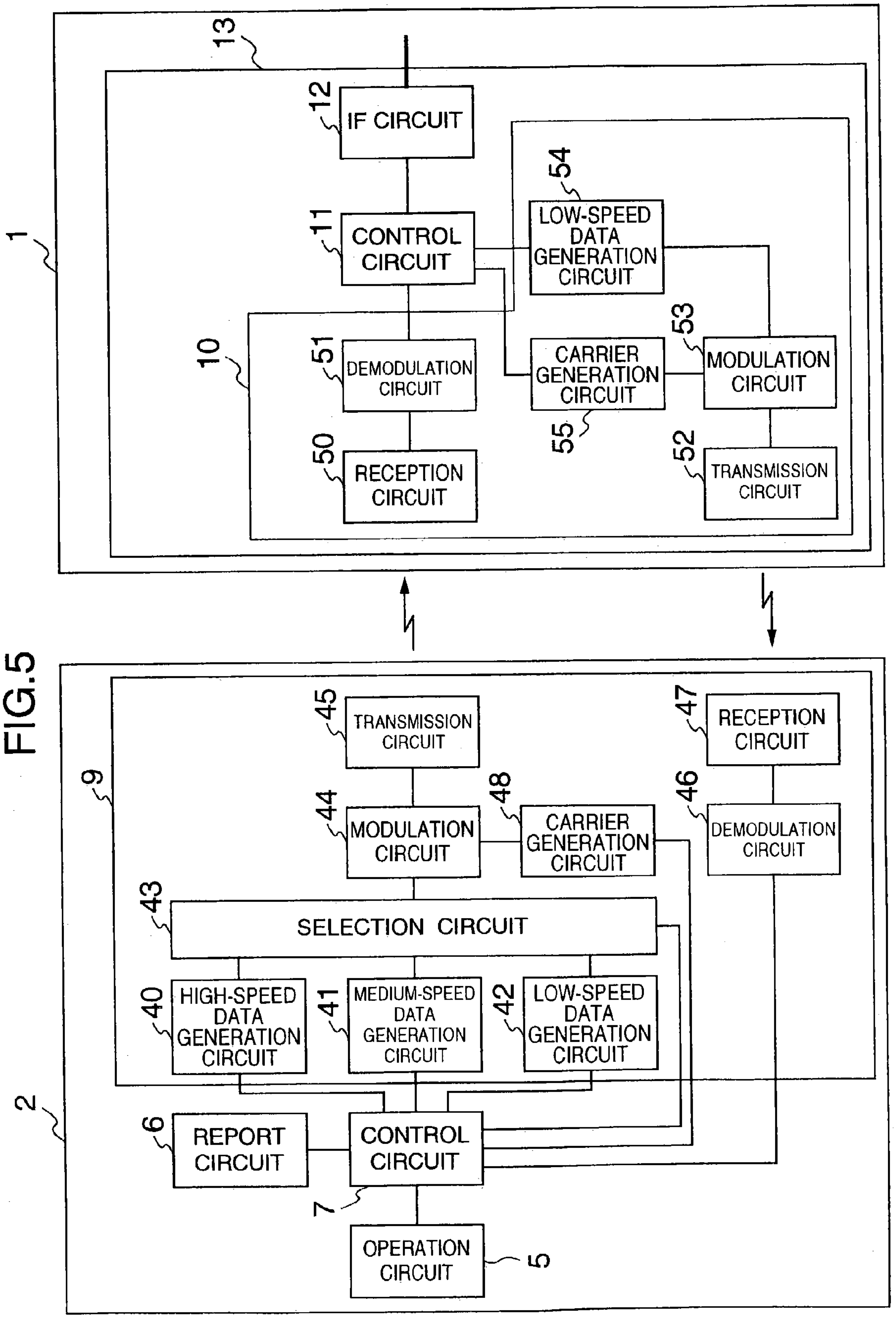
FIG. 5 is a block diagram showing one embodiment of the present invention.

Next, the constructions of the terminal board 2 and the operation apparatus 13 for executing these operations will be explained with reference to FIG. 5. FIG. 5 shows in detail the constructions of the terminal board 2 and the operation apparatus 13 of the remote keyless entry system shown in FIG. 2, and is a block diagram showing, in particular, the construction of the communication circuits 9 and 10.

Referring to FIG. 5, reference numeral 40 denotes a high-speed data generation circuit, reference numeral 43 denotes a selection circuit, reference numerals 44 and 53 denote modulation circuits, reference numerals 45 and 52 denote transmission circuits, reference numerals 46 and 51 denote demodulation circuits, reference numerals 47 and 50 denote reception circuits and reference numerals 48 and 55 denote carrier generation circuits.

The operations of FIG. 5 will be explained. When the operator operates the operation button 5, the operation button 5 sends the operation content to the control circuit 7. The control circuit 7 first sends the carrier output signal to the carrier generation circuit 48. The carrier from the carrier generation circuit 48 is sent to the modulation circuit 44. The modulation data signal is not applied to the modulation circuit 44 but only a non-modulated carrier is sent to the transmission circuit 45. The transmission circuit 45 amplifies the carrier to the output sufficient to propagate it into the space and emits the signal into the space through the antenna (not shown).

Next, the control circuit 7 gives the high-speed data output instruction to the high-speed data generation circuit 40. The high-speed data generation circuit 40 generates the data inclusive of the ID of the operation apparatus and the kinds of its operation, and sends them to the selection circuit 43. At the same time, the control circuit 7 so controls the selection circuit 43 as to select the high-speed data from the high-speed data generation circuit 40. The selection circuit 43 passes the high-speed data of the high-speed data generation circuit 40 and sends it to the modulation circuit 44. The modulation circuit 44 modulates the carrier signal from the carrier generation circuit 48 by the high-speed data from the high-speed data generation circuit 40 and sends it to the transmission circuit 45. The transmission circuit 45 emits the signal into the space through the antenna (not shown) in the same way as transmission of the carrier. The reception circuit 47 receives the low-speed response signal from the operation apparatus 13 and sends it to the demodulation circuit 46. The demodulation circuit 46 demodulates the response signal from the modulated signal from the reception circuit 47 and sends it to the control circuit 7.

When the response content is correct, the control circuit 7 sends a response report signal to the report circuit 6. The report circuit 6 comprises a single or a plurality of displays, sound generation circuits or vibration circuits, and reports the operator that the operation is completed. The operation is completed here, and the operation mode again returns to the operation waiting state from the operation button 5.

When the content of the response signal from the demodulation circuit 46 is not correct or when no response is given within a predetermined time, the control circuit 7 gives a medium-speed data generation instruction to the medium-speed data generation circuit 41. The medium-speed data generation circuit 41 generates the data including the ID of the terminal board and the kinds of operation, and sends them to the selection circuit 43. In this instance, the control circuit 7 so sets the selection circuit 43 as to pass the medium-speed data.

Thereafter, the signal including the medium-speed data is outputted into the air from the transmission circuit 45 through the antenna (not shown in the drawings) in the same way as in high-speed data transmission. When the suitable response signal exists in the same way as transmission of the high-speed data, the existence is reported and when the suitable response signal does not, low-speed data transmission is executed. When the suitable response to low-speed data transmission exists, the report is made and the operation is completed. When it does not exist, the operation is completed without making the report.

On the other hand, the reception circuit 50 receives the signal from the operation apparatus 2 and sends it to the demodulation circuit 51. The demodulation circuit 51 demodulates the data from the reception signal and sends it to the control circuit 11. The control circuit 11 confirms the ID of the demodulated data, the kind of the operation, etc. When the data is the suitable data, the control circuit 11 outputs the operation instruction to the IF circuit 12 and at the same time, transfers the carrier generation instruction to the carrier generation circuit 55 and sends the response data to the low-speed data generation circuit 54. The low-speed data generation circuit 54 converts the response data from the control circuit 11 to the data of the low-speed data and sends it to the modulation circuit 53. The modulation circuit 53 modulates the carrier of the carrier generation circuit 55 by the low-speed response data from the low-speed data generation circuit 54 and sends the modulated carrier to the transmission circuit 52. The transmission circuit 52 transmits the modulated response signal through the antenna (not shown in the drawings). The control circuit 11 confirms the ID of the demodulated data, the kind of the operation, etc. When the data is not suitable such as when falloff of the data exists, the control circuit 11 transfers the carrier generation instruction to the carrier generation circuit 55 and at the same time, sends to the low-speed data generation circuit 54 the response data representing that the reception data is not suitable. The low-speed data generation circuit 54 converts the response data from the control circuit 11 to the data of the low-speed data rate and sends it to the modulation circuit 53. The modulation circuit 53 modulates the carrier of the carrier generation circuit 55 by the low-speed response data from the low-speed data generation circuit 54 and sends it to the transmission circuit 52. The transmission circuit 52 transmits the modulated response signal through the antenna (not shown in the drawings).

Figure 6:
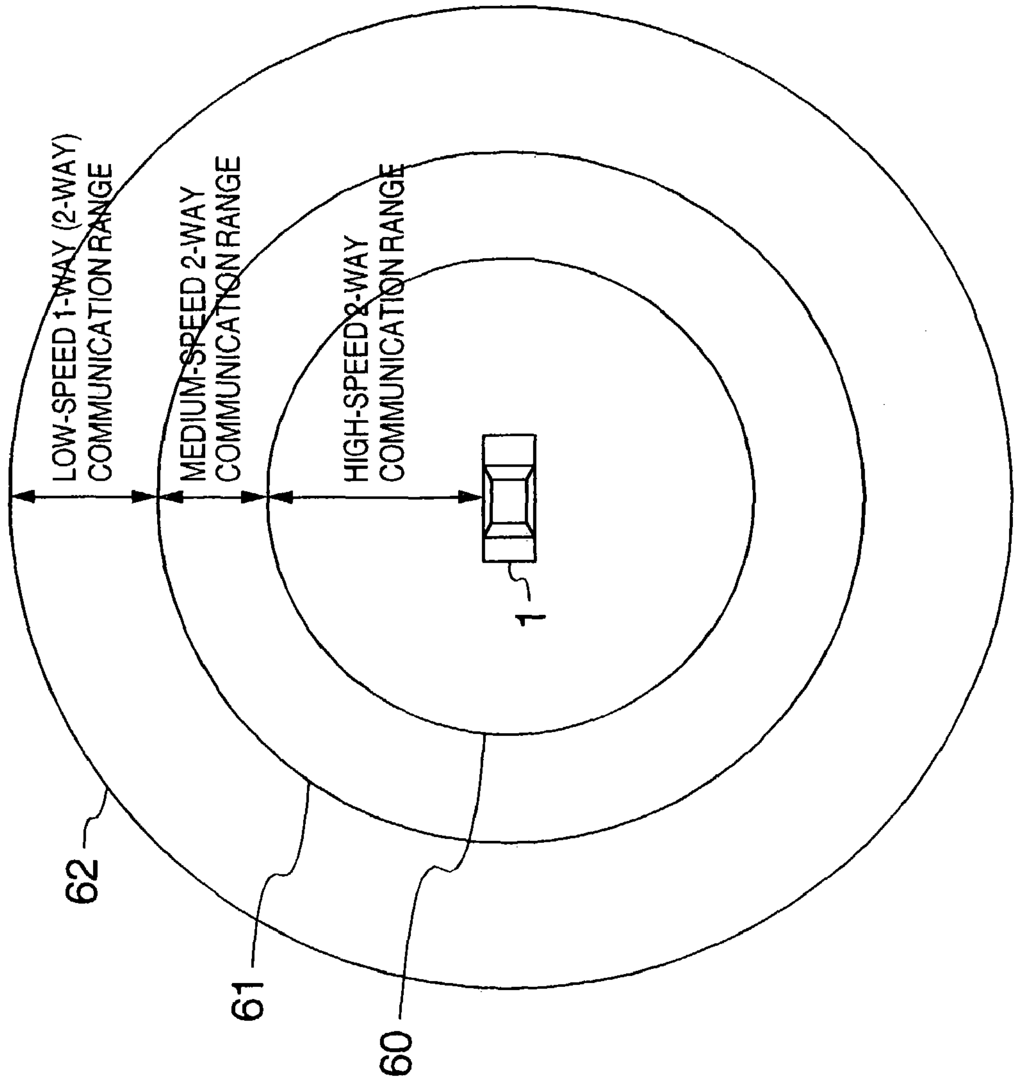
FIG. 6 is a diagram showing the distance of a terminal board from a moving car.

The operative distance acquired by the constructions and the operations described above will be explained with reference to FIG. 6. FIG. 6 is a schematic view showing the distance of the terminal board from the operative car. In FIG. 6, reference numeral 1 denotes the car, reference numeral 60 denotes the range capable of high-speed 2-way communication, reference numeral 61 denotes the range capable of medium-speed 2-way communication and reference numeral 62 denotes the range capable of low-speed 1-way (or 2-way) communication.

High-speed 2-way communication shown in FIG. 3 is established inside the high-speed 2-way communicable range 60 and since the communication finishes within a short communication time, the operation can be carried out with substantially no waiting time. Medium-speed 2-way communication shown in FIG. 3 is established inside the medium-speed 2-way communication range 61. Though a longer communication time is necessary than in high-speed 2-way communication, communication of a longer distance can be made. Further, low-speed 1-way (or 2-way) communication needs a longer communication time and involves the possibility that 2-way communication cannot be established. Nonetheless, communication of a longer distance becomes possible than in the medium-speed 2-way communication range 61.

In the explanation given above, the system changes the communication data rate in the three stages % of the high-speed, the medium-speed and the low-speed, 1-way communication also become effective, when 2-way communication is not established at the low-speed. However, when high speed response can not be made even though the data rate is changed into two stages of high-speed and low-speed communications, 1-way communication in low-speed may be made. Further when the 2-way communication is not established in a single data rate value, the 1-way communication may be made. Besides, the other data rate such as four or more stages including a super-high-speed other than high-speed, medium-speed and low-speed may be provided.

Figure 7:
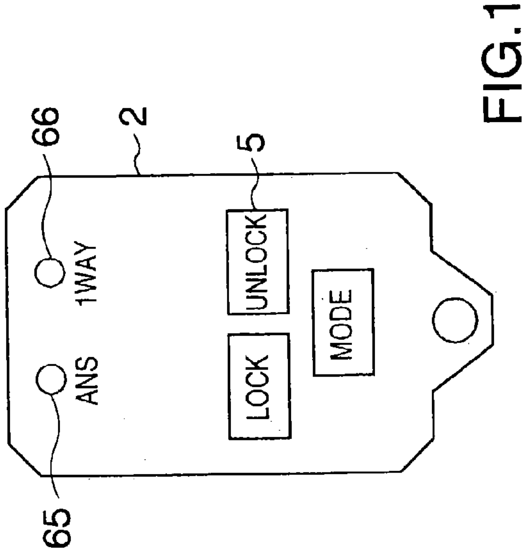
FIG. 7 is a schematic view showing the appearance of one embodiment of the present invention.

Next, a structural example of the appearance of the terminal board 2 will be explained with reference to FIG. 7. FIG. 7 is a simple appearance view of the terminal board 2 when viewed from the front.

In FIG. 7, reference numeral 65 denotes a report circuit (a part of the report circuit 6 described already) for reporting the operator that 2-way communication is established, reference numeral 66 denotes a report circuit (a part of the report circuit 6 described already) for reporting to the operator that 2-way communication is not established and communication is made by 1-way communication.

The operator operates the operation button 5. When the suitable response is returned from the operation apparatus (not shown in FIG. 7), the report circuit 65 is turned on, and when 2-way communication is not established and communication is made by 1-way communication, the report circuit 66 reports that effect to the operator.

Figure 8:
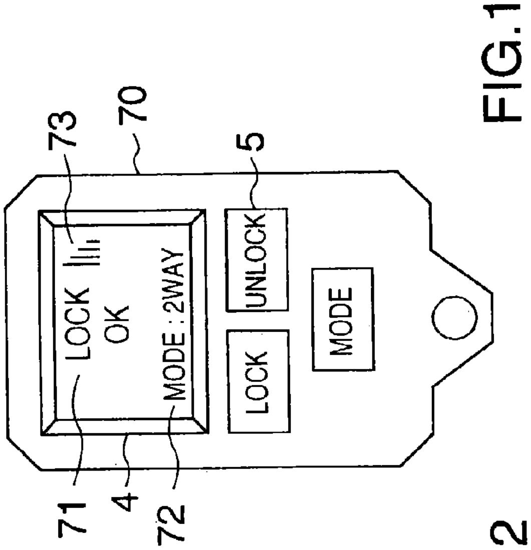
FIG. 8 is a schematic view showing the appearance of another embodiment of the present invention.

Next, another structural example of the appearance of the terminal board is explained with reference to FIG. 8. In FIG. 8, reference numeral 70 denotes the terminal board, reference numeral 71 denotes a report indicator (a part of the aforementioned report circuit 6) for reporting to the operator that 2-way communication is established when it is made, reference numeral 72 denotes a report indicator (a part of the aforementioned report circuit 6) for reporting to the operator that 2-way communication is not established and communication is therefore made by 1-way communication, and reference numeral 73 denotes an indicator representing whether high-speed 2-way communication or medium-speed 2-way communication or low-speed 2-way communication is established.

When the suitable response is returned from the operation apparatus (not shown in FIG. 8), the report indicator 71 executes the operation display. In this instance, if high-speed 2-way communication is established, all the four indicators of the indicator 73 are displayed. When medium-speed 2-way communication is established, three indicators (three from the right side) of the indicator 73 are displayed with the operation mode display of the report indicator 71. When low-speed 2-way communication is established, two indicators (from the right side) of the indicator 73 are displayed with the operation mode display of the report indicator 71.

When 2-way communication is to be made, this mode is displayed on the report circuit 72 (MODE: 2-WAY, etc) and is reported to the operator. When 2-way communication is not established and communication is made by 1-way communication, the report indicator 72 displays this mode (MODE: 1-WAY, etc) and this mode is reported to the operator. Also, one indicator (from the right side) of the indicator 73 is displayed and this mode is reported to the operator.

This operation of the report circuit enables the operator to confirm in which communication mode the operation mode exists, and relieves the operator of uncertainty when using the system.

Figure 9:
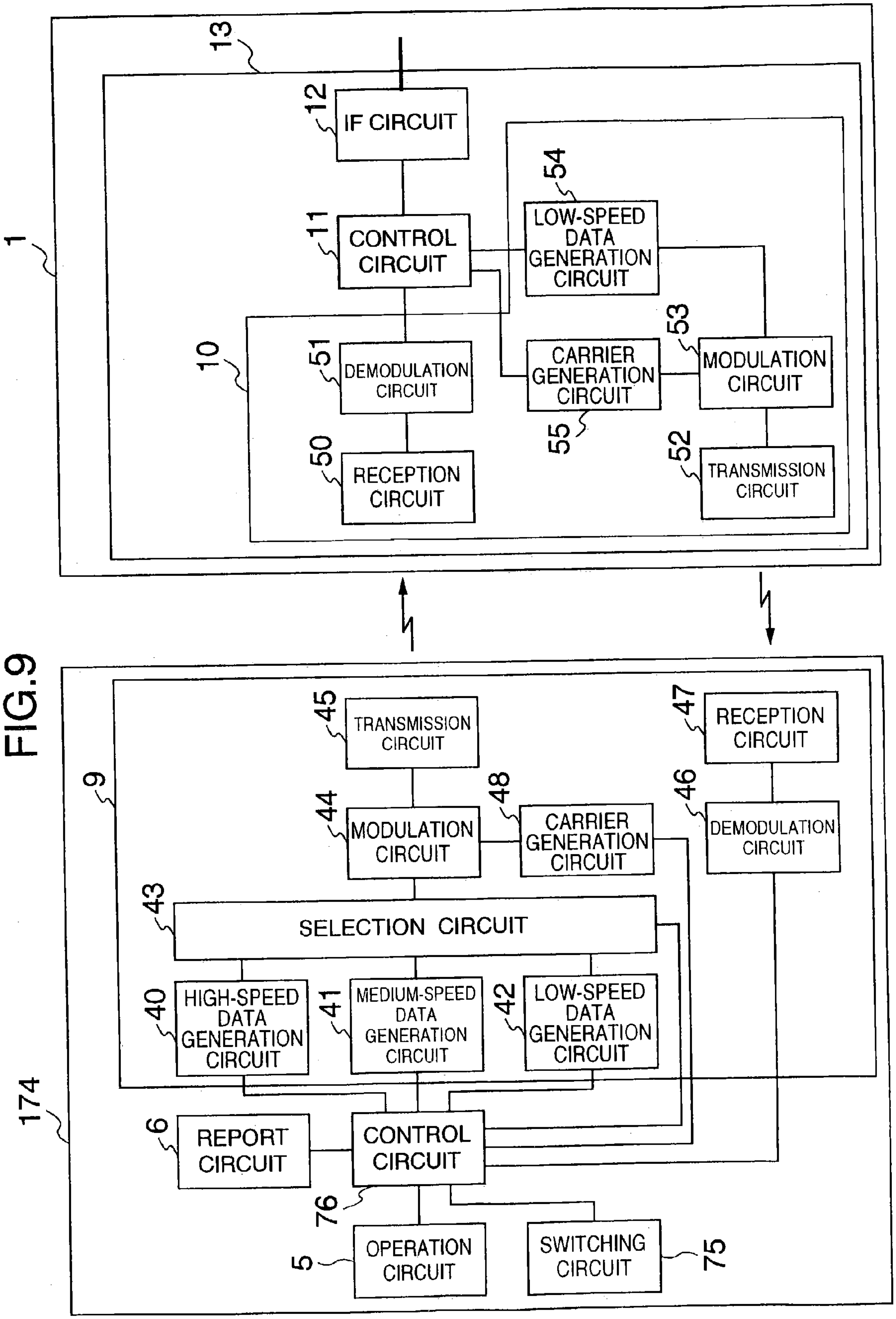
FIG. 9 is a block diagram showing another embodiment of the present invention.

Next, another embodiment of the present invention will be explained with reference to FIG. 9. The feature of this embodiment resides in that automatic switching of the data rate shown in FIG. 5 is done by a manual switch. FIG. 9 is a block diagram showing the construction of this embodiment. Referring to FIG. 9, reference numeral 174 denotes the terminal board, reference numeral 75 denotes the switching circuit and reference numeral 76 denotes the control circuit. The operator sets in advance the switch to 2-way or 1-way. When communication is made in a relatively short distance, or when confirmation of the operation is necessary, the switch is set to 2-way communication. When confirmation of the operation is not necessary and communication of a relatively long distance is desired, 1-way communication is set.

The switching circuit 75 sends the set content to the control circuit 76. When the switching circuit 75 is set to 1-way communication, the control circuit 76 instructs the high-speed data generation circuit 40, the medium-speed data generation circuit 41 and the low-speed data generation circuit 42 to generate in order the high-speed data, the medium-speed data and the low-speed data, respectively, even if the response from the terminal board 13 does not exist.

When the switching circuit 75 is set to 2-way, the operation explained with reference to FIG. 5 is carried out but finally, the operation is completed in 2-way communication without setting the mode to 1-way communication.

This embodiment makes it possible for the operator to set arbitrarily the 1-way and 2-way communication modes. Therefore, the operator can easily recognize in which mode communication is now made and can be relieved of uncertainty of the communication mode.

Next, an example of the appearance of the terminal board 174 shown in FIG. 9 will be explained with reference to FIG. 10. This drawing is a schematic view showing the appearance of the terminal board equipped with the switching circuit.

Figure 10:
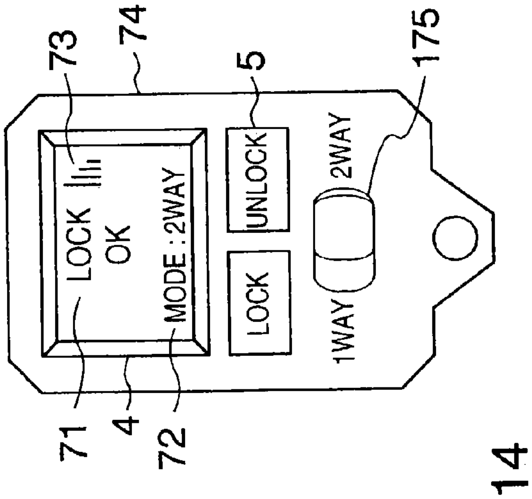
FIG. 10 is a schematic view showing the appearance of another embodiment of the present invention.

In FIG. 10, reference numeral 175 denotes the switching circuit. The switching circuit 175 comprises a slide switch or a toggle switch, and makes it possible for the operator to confirm at sight in which communication mode the mode now is, as shown in FIG. 10. Because the operator can easily confirm the operation mode in this way, the operator is relieved of uncertainty in the communication mode.

Next, still another embodiment of the present invention will be explained with reference to FIG. 11. The feature of this embodiment resides in that an instruction storage circuit is provided to the terminal board so that it can store the instruction generated by the terminal board and enables the operator to confirm the past instructions when the operator so desires.

Figure 11:
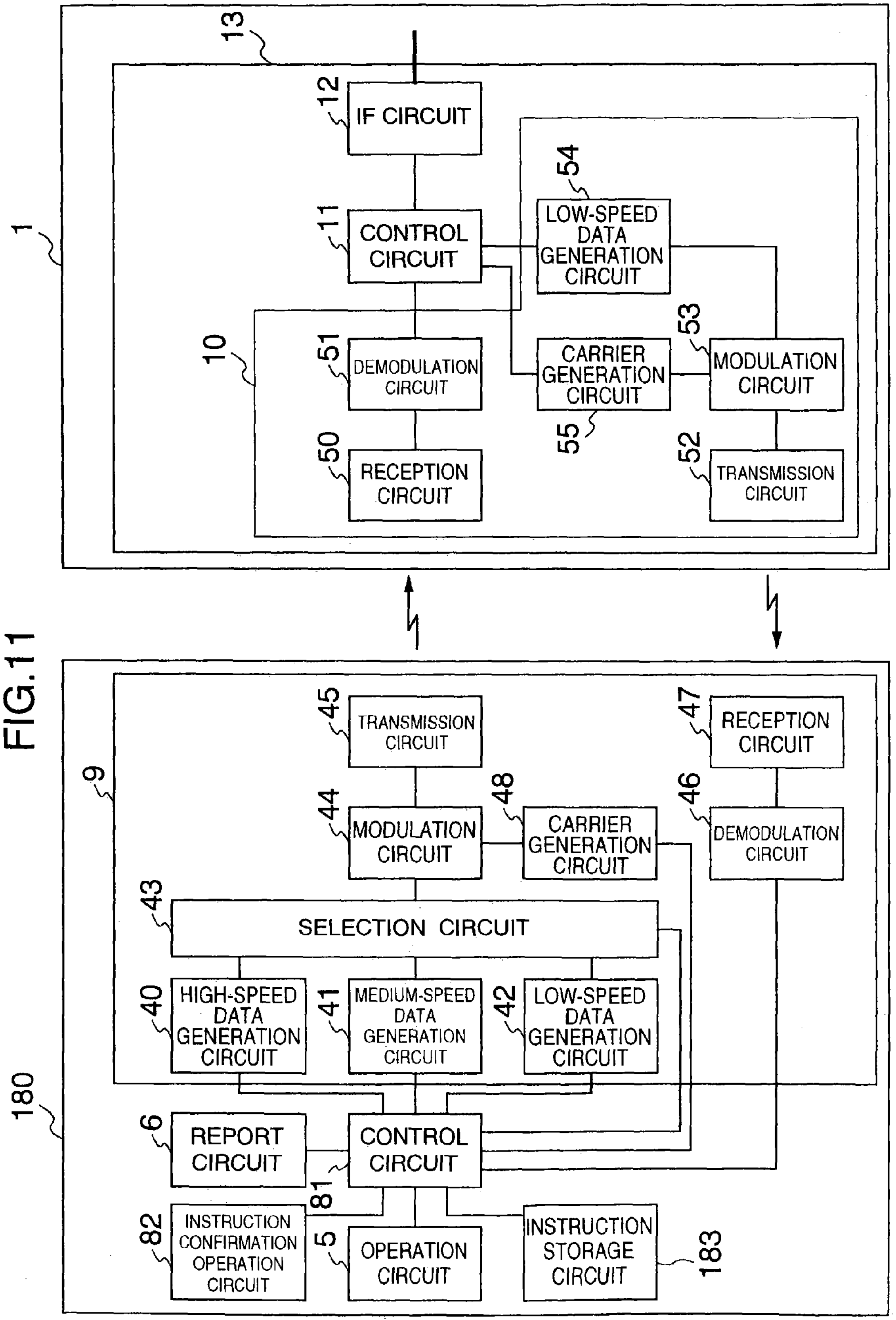
FIG. 11 is a block diagram showing still another embodiment of the present invention.

Referring to FIG. 11, reference numeral 180 denotes the terminal board, reference numeral 81 denotes the control circuit, reference numeral 82 denotes the instruction confirming operation button and reference numeral 83 denotes the instruction storage circuit. The operation of FIG. 11 will be explained next.

When the operator inputs the operation instruction to the operation apparatus 13 from the terminal board 80 through the operation button 5, the control circuit 81 transmits the operation data to the operation apparatus 13 through the communication circuit 9 and sends the operation content to the instruction storage circuit 83. The instruction storage circuit 83 stores the instruction.

When the operator inputs the instruction confirmation from the instruction confirming operation button 82, the instruction confirming operation button 82 sends the confirmation instruction to the control circuit 81. Receiving this instruction, the control circuit 81 reads out the past instruction data from the instruction storage circuit 83 and sends it to the report circuit 6.

The report circuit 6 reports the past instruction to the operator.

When the driver is uncertain as to whether or not he locks the doors, for example, the construction and the operation described above enables the driver to confirm the door lock.

The appearance of the terminal board 80 in the embodiment shown in FIG. 11 for confirming the instruction will be explained with reference to FIG. 12.

Figure 12:
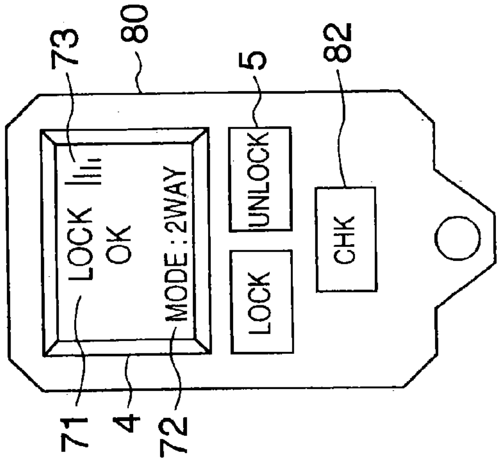
FIG. 12 is a schematic view showing the appearance of still another embodiment of the present invention.

The feature of the terminal board shown in FIG. 12 resides in that it is provided with the instruction confirming operation button and with the report circuit so as to confirm the instruction. When the operator desires to confirm the instructions that have been given in the past, he pushes the instruction confirming operation button 82. The report circuit 71 can then display the past instructions and report them to the operator.

Still another embodiment of the present invention will be explained with reference to FIG. 13.

Figure 13:
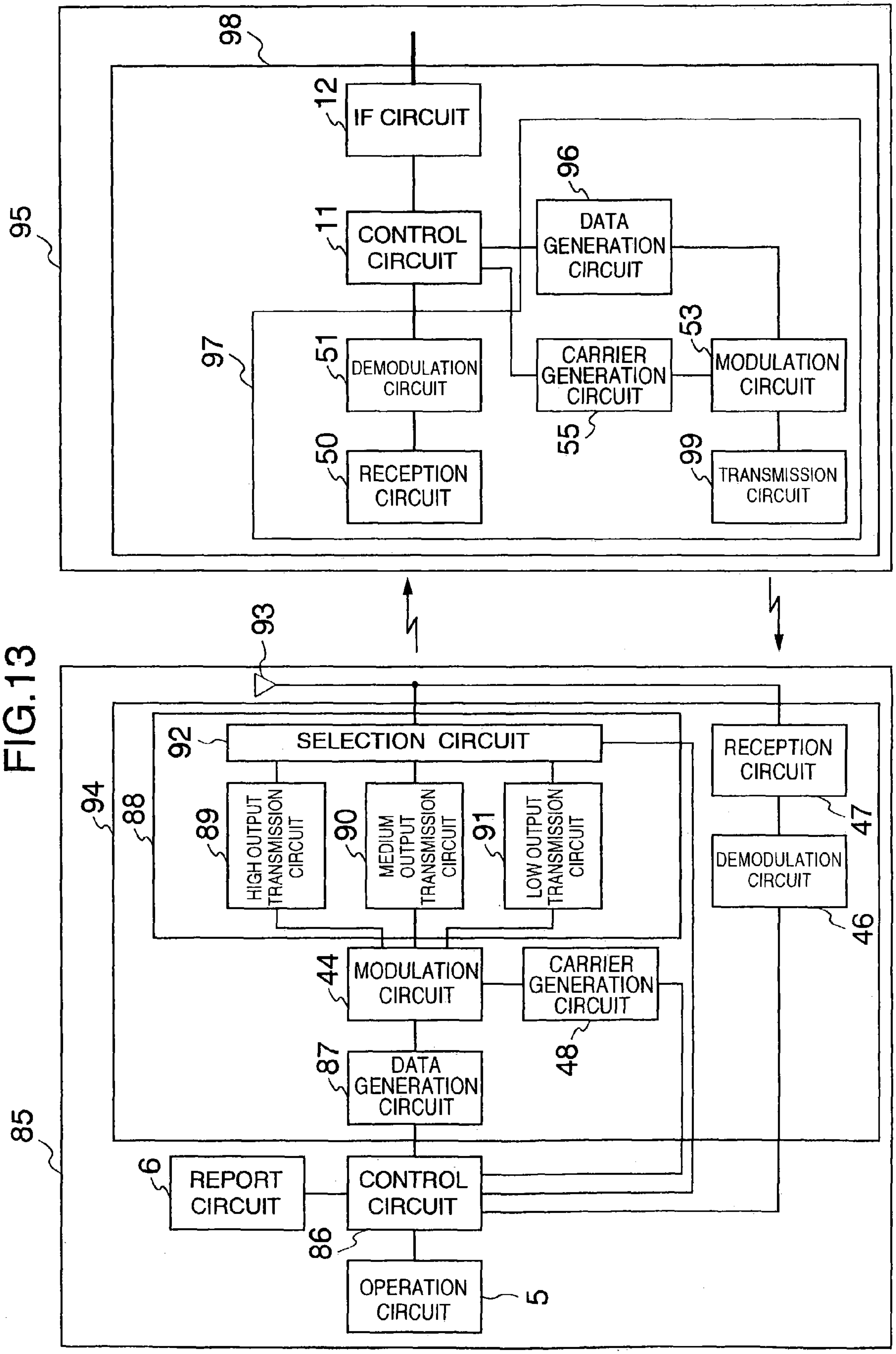
FIG. 13 is a block diagram showing still another embodiment of the present invention.

The feature of the embodiment shown in FIG. 13 resides in that the transmission output is serially increased and at the point when the communication is accomplished, the communication operation is completed. In FIG. 13, reference numeral 85 denotes the terminal board, reference numeral 86 denotes the control circuit, reference numerals 87 and 96 denotes the data generation circuits, reference numeral 88 denotes the transmission circuit, reference numeral 89 denotes a high output transmission circuit, reference numeral 90 denotes a medium output transmission circuit, reference numeral 91 denotes a low output transmission circuit, reference numeral 92 denotes the selection circuit, reference numeral 93 denotes the antenna, the reference numeral 94 denotes the communication circuit, reference numeral 95 denotes the car, reference numeral 97 denotes the communication circuit, reference numeral 98 denotes the operation apparatus and reference numeral 99 denotes the transmission circuit. The operation of FIG. 13 will be explained next. In the embodiment shown in FIG. 5, transmission is effected while the data transfer rate is serially changed, but in the embodiment shown in FIG. 13, the transmission output is changed in place of the data transfer rate. The selection circuit 92 first selects the output of the low output transmission circuit 91 and when communication is not established, it selects the medium output transmission circuit 90. When communication is not yet established even at the medium output, the selection circuit 92 selects the high output transmission circuit 89. Incidentally, the transmission circuit 99 is a high output transmission circuit in connection with the response from the operation apparatus 98. Because the output can be serially changed in this way, battery consumption of the terminal board can be limited in the case of communication of the short range.

Because the transmission output from the terminal board can be serially changed as described above, the arrival distance can be serially changed and the quick operation can be made in the case of the short distance. Therefore, the operator can use more comfortably the remote keyless entry system. In the case of the distance at which 2-way communication cannot be made, 1-way communication is made instead and the report to that effect is given to the terminal board. Therefore, the operator can take the action of confirming the operation end report from the car side without relying on the response report of the terminal board and can operate the system without any uncertainty.

Next, still another embodiment of the present invention directed to accomplish a remote keyless entry system, which operates automatically even when both hands of the operator are full, minimizes battery consumption and reduces frequency of the battery exchange, will be explained. This embodiment, too, uses the remote keyless entry system shown in FIGS. 1 and 2.

In this embodiment, the operation button intermittently generates the radio wave modulated by the identification code so that the automatic operation can be achieved even when both hands of the operator are full. When the operator carrying the portable transmitter comes close to the car, the receiver mounted to the car receives the radio wave and produces the automatic output for unlocking the door lock of the car when the identification code is correct. This automatic output will be explained with reference to FIGS. 1 and 2. In this embodiment, the automatic output time is displayed on the display 4. When the operator pushes the mode switching button of the operation button 5 or keeps pushing the door lock release button of the operation button 5, etc, the operation mode of the terminal board 2 automatically enters the automatic output mode. When the operation button such as the door lock release is operated after the automatic output mode is established, the terminal board 2 automatically outputs either continuously or intermittently the operation instruction (such as the door lock release instruction). When the operator keeps pushing the operation button (such as the door lock release button) of the operation button 5, the automatic output is effected as such. When the operator walks up to the car 1 while carrying the terminal board 2 under this state and when the receiver inside the operation apparatus receives the signal from the terminal board 2, the operation apparatus transfers the signal for activating the function corresponding to the input of the operation button 5 (such as the door lock release) to the car 1. When the operation is completed or when the operation signal of the car is transferred, the operation apparatus returns the operation end signal to the terminal board 2. The terminal board 2 receives the operation end signal and stops the automatic output of the operation instruction.

Next, the explanation will be given with reference to FIG. 2. When the operator executes the instructing operation of the door lock release, for example, through the operation button 5, the operation button 5 sends this input to the control circuit 7. When the operator pushes the mode switching button of the operation button 5 or keeps pushing the operation button such as the lock release for a longer time than the predetermined time at this time, the operation mode changes to the automatic output mode. When the automatic output mode is established as the operator keeps pushing the operation button for a time longer than the predetermined time, the control circuit 7 counts the push time of the button of the operation button 5 and if this time is longer than the time set in advance, the mode may be switched to the automatic output mode. The control circuit 7 sends the automatic output time data, that is set in advance to the time counting circuit 8, simultaneously with switching of the mode to the automatic output mode.

The time counting circuit 8 loads the automatic output time data from the control circuit 7 and then executes the count-down operation. When the counter (not particularly shown in the drawings) of the time counting circuit 8 reaches zero, a signal representing that counting is completed is sent to the control circuit 7. The control circuit 7 starts generating the operation instruction signal (such as the door lock release instruction signal) from the point at which the mode changes to the automatic output mode, and sends it to the communication circuit 9. The communication circuit 9 executes the communication operation for the operation apparatus 13 in accordance with the instruction from the control circuit 7.

The communication circuit 10 inside the operation apparatus 13 receives the signal from the communication circuit 9 and sends the instruction (such as the door lock release instruction) from the terminal board 2 to the control circuit 11.

The control circuit 11 decodes the required function from the communication signal transferred thereto and sends the decoding result to the IF circuit 12.

The IF circuit 12 is connected to the internal communication network inside the car 1, converts the signal of the required function from the control circuit 11 to the signal of the internal communication network and delivers it to the internal communication network. When the door lock release signal is delivered as the request signal, the car detects the door lock release signal of the internal communication network and releases the door lock.

When this operation is completed, the control circuit 11 sends the operation end signal to the communication signal 10. The communication circuit in turn sends the operation end signal to the communication circuit 9 inside the terminal board 2. The communication circuit 9 receives the operation end signal and sends it to the control circuit 7. Receiving this operation end signal, the control circuit 7 stops the automatic output and switches the operation mode to the normal manual mode.

If the operation end signal is not returned in the manner described above, the control circuit 7 receives the count end signal from the time counting circuit 8 and stops the automatic output.

When the operation mode is the automatic output mode, the control circuit 7 sends the report to that effect to the display 4.

Also, the control circuit 7 receives the data representing the remaining time of the automatic output mode from the time counting circuit 8 and sends it to the display 4.

Further, the control circuit 7 receives the operation end signal from the operation apparatus 13 and sends the operation end display data to the display 4.

The display 4 receives the data described above and displays them.

Because automatic transmission is effected by the operations described above, the automatic output is stopped as soon as the operation on the car side is started. Therefore, power is not consumed in vain.

Next, an example of the display form of the display 4 of the terminal board 2 will be explained with reference to FIG. 14.

Figure 14:
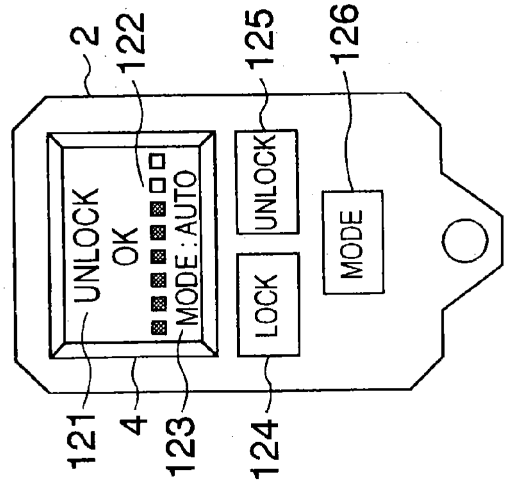
FIG. 14 is a schematic view showing the appearance of an operation button an a displaying method of a display.

FIG. 14 is an appearance view showing the appearance of the terminal board. In FIG. 14, reference numeral 121 denotes a display representing completion of the door lock release operation, reference numeral 122 denotes a display representing the automatic output time, reference numeral 123 denotes a display representing the operation mode, reference numeral 124 denotes a lock button, reference numeral 125 denotes a lock release button and reference numeral 126 denotes a mode switching button. Though all the displays are shown in FIG. 14, the display 122 representing the automatic output and the display 123 representing the operation mode are not displayed in practice in the way shown in FIG. 14 because the automatic output mode is released in the practical operation when the display 121 representing the end of the operation is displayed. Though the display representing the automatic output time is displayed by figures, it may be displayed by numerals, too.

Figure 15:
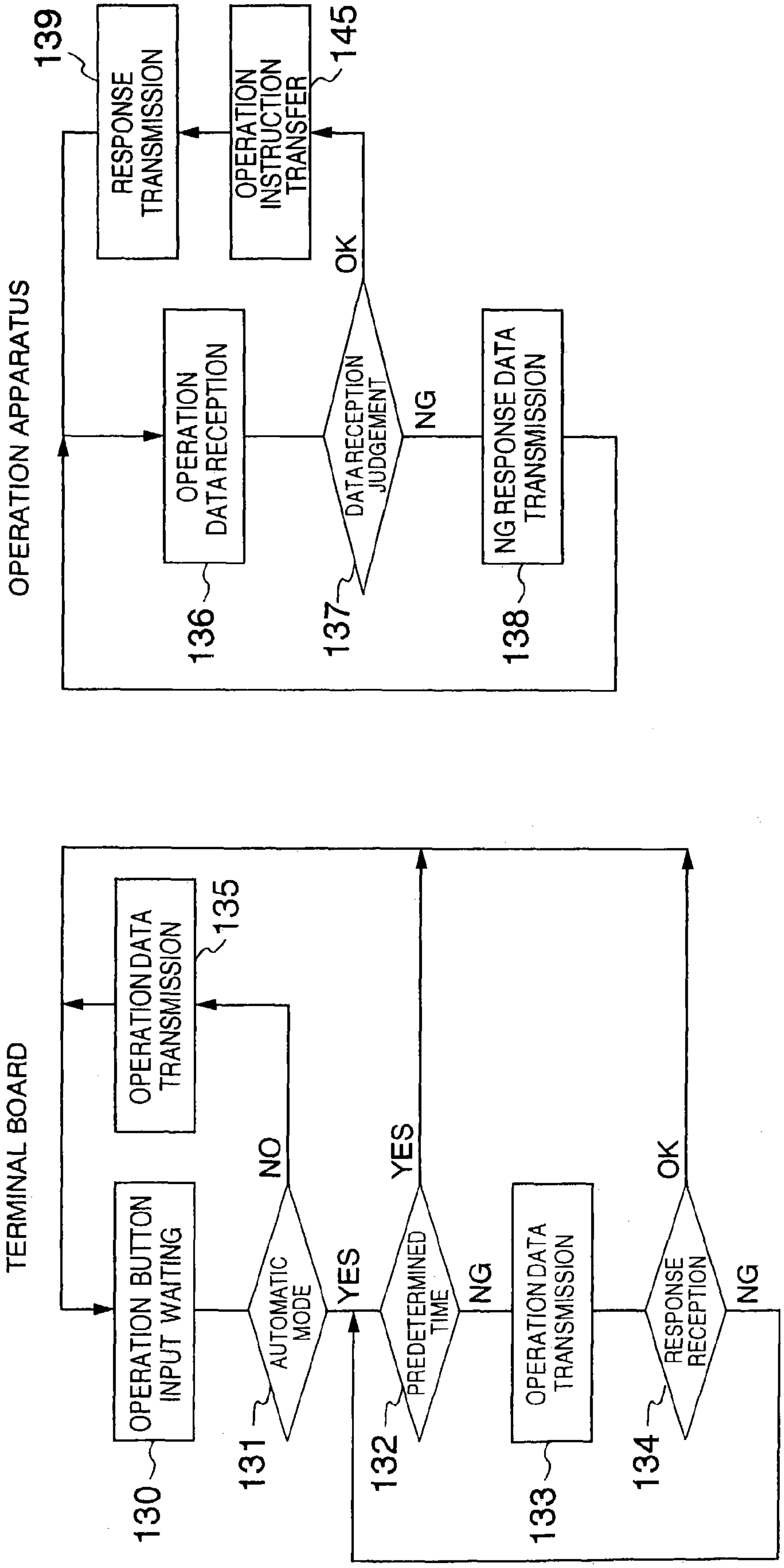
FIG. 15 is a flowchart showing the operations of a terminal board and an operation apparatus.

Next, the operation of the remote keyless entry system having the construction shown in FIG. 2 will be explained in further detail with reference to FIG. 15. FIG. 15 is a flowchart showing the operation of each of the terminal board 2 and the operation apparatus 13 shown in FIG. 2. Incidentally, the flowchart of the terminal board 2 shows the operation from the state in which the operation mode has already been set to the automatic output mode. (The shift to the automatic output mode will be described later). The left part of FIG. 15 is the flowchart showing the operation of the terminal board 2 and the left part is the flowchart showing the operation of the operation apparatus 13. In FIG. 15, reference numeral 130 denotes an operation button input waiting process for inputting the operation instruction, reference numeral 131 denotes an automatic mode detection branch process for branching the flow depending on whether the present mode is the automatic output mode or the manual mode, reference numeral 132 denotes a predetermined time branch process for judging whether or not the automatic output time has passed away and for branching the flow, reference numerals 133 and 135 denote an operation data transmission process for outputting the data of the operation instruction, reference numeral 134 denotes a response reception branch process for judging whether or not the operation end signal for the operation data transmission process 133 is received and whether or not the processing is completed, and for branching the flow, reference numeral 136 denotes an operation data reception process for receiving the operation instruction data on the side of the operation apparatus 13, reference numeral 137 denotes a data reception judgement branch process for judging whether or not the operation data is normally received, and for branching the flow, reference numeral 138 denotes a NG response transmission process for reporting the failure of data reception to the terminal board 2 when the data reception is not correctly effected, reference numeral 139 denotes a response data transmission process for giving the response to the terminal board 2 when reception is correctly made, and reference numeral 145 denotes an operation instruction to the actuator (not shown) of the car.

FIG. 15 will be explained. First, the terminal board is on standby under the operation button input waiting process 130.

When the operator pushes the operation button (for example, the automatic door lock release button), the process flow enters the automatic mode detection branch process 131. In the automatic mode detection branch process 131, if the mode is the automatic output mode at this time, the process flow shifts to the predetermined time branch process.

If the mode is not the automatic output mode (manual output mode), on the other hand, the process flow shifts to the operation data transmission process 135 and the instruction data of the operation button (door lock release button, in this case) is transmitted either once or a plurality of times.

The predetermined time branch process 132 judges whether or not the automatic output operation set time is reached, and when the predetermined time is not reached, the process flow shifts to the operation data transmission process 133.

The operation data transmission process 133 transmits either once or a plurality of times the instruction data of the operation button (the door lock release button, in this case).

Next, the process flow shifts to the response reception branch process 134. This response reception branch process 134 receives the response data from the operation apparatus 13. If the response data received hereby is the response data that represents the finish of the operation, the operation is terminated and the mode returns again to the operation button input waiting process 130. When the response data is the data other than the operation end data, or when no response data is returned within the reception time, the process flow again shifts to the predetermined time branch process 132. The predetermined time branch process 132, the operation data transmission process 133 and the response reception branch process 134 are serially repeated within the predetermined time or until the response data of the finish of the operation is received.

On the other hand, the operation apparatus 13 waits for the operation data under the state of the operation data reception process 136. When the operation apparatus 13 receives the operation data from the terminal board 2, the process flow shifts to the data reception judgement branch process 137. Confirmation of the ID number and confirmation of the kind of the operation are executed in the data reception judgement branch process 137. If the data transferred from the terminal board 2 is correct, the operation instruction is transferred to the car 1 in the operation instruction transfer process 145 and then the response data of the finish of the operation is transferred to the terminal board 2 in the response data transmission process 139. The operation mode then returns to the operation data reception process 136. If the reception data is not correct in the data reception judgement branch process 137, the process flow shifts to the NG response data transmission process 138, and the NG response data representing that the reception data is not correct is transmitted. The process flow then returns to the operation data reception process 136. The automatic output operation is effected by a series of operations described above.

Next, the manipulation and operation required for shifting to the automatic output mode will be explained with reference to FIGS. 16A and 16B.

Figure 16B:
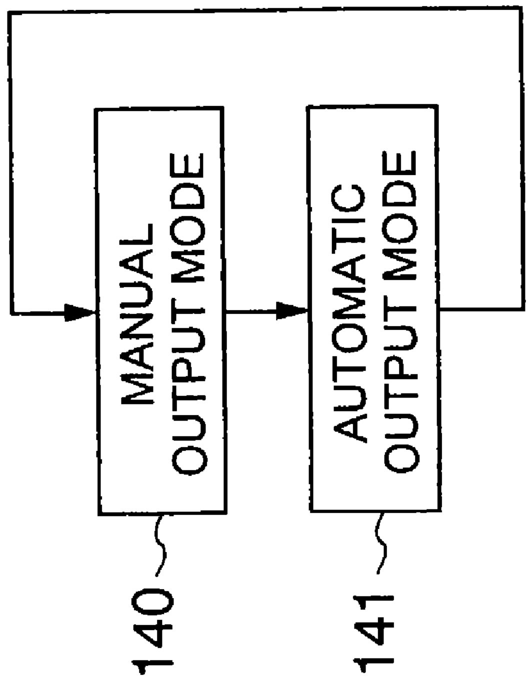
FIG. 16B is a flowchart showing the mode switching operation.
Figure 16A:
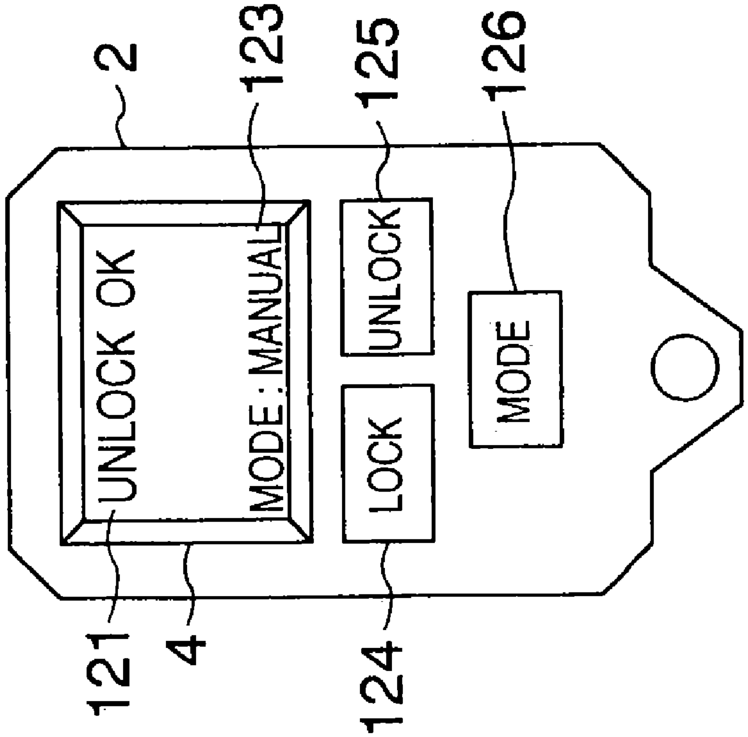
FIG. 16A is a schematic view showing the appearance of a mode display of a terminal board.

FIG. 16A is an appearance view showing the appearance of the terminal board and FIG. 16B is an operation flowchart showing the shift of the state between the automatic mode and the manual mode. In FIG. 16B, reference numeral 140 denotes the state of the manual output mode and reference numeral 141 does the state of the automatic output mode state.

The operation of FIG. 16B will be explained. When the mode switch button 126 is pushed, the manual output mode and the automatic output mode are changed over. The initial state of the mode is generally the manual output mode 140.

When the operator pushes once the mode switch button, the operation mode switches to the automatic output mode 141. When the operator pushes the mode switch button once more, the operation mode switches to the manual output mode. When the operation mode switches to the automatic output mode, the operation mode again shifts to the manual output mode of the initial state by the finish of the operation or the finish of the automatic output time as described in the explanation of the operation given above.

Figure 17:
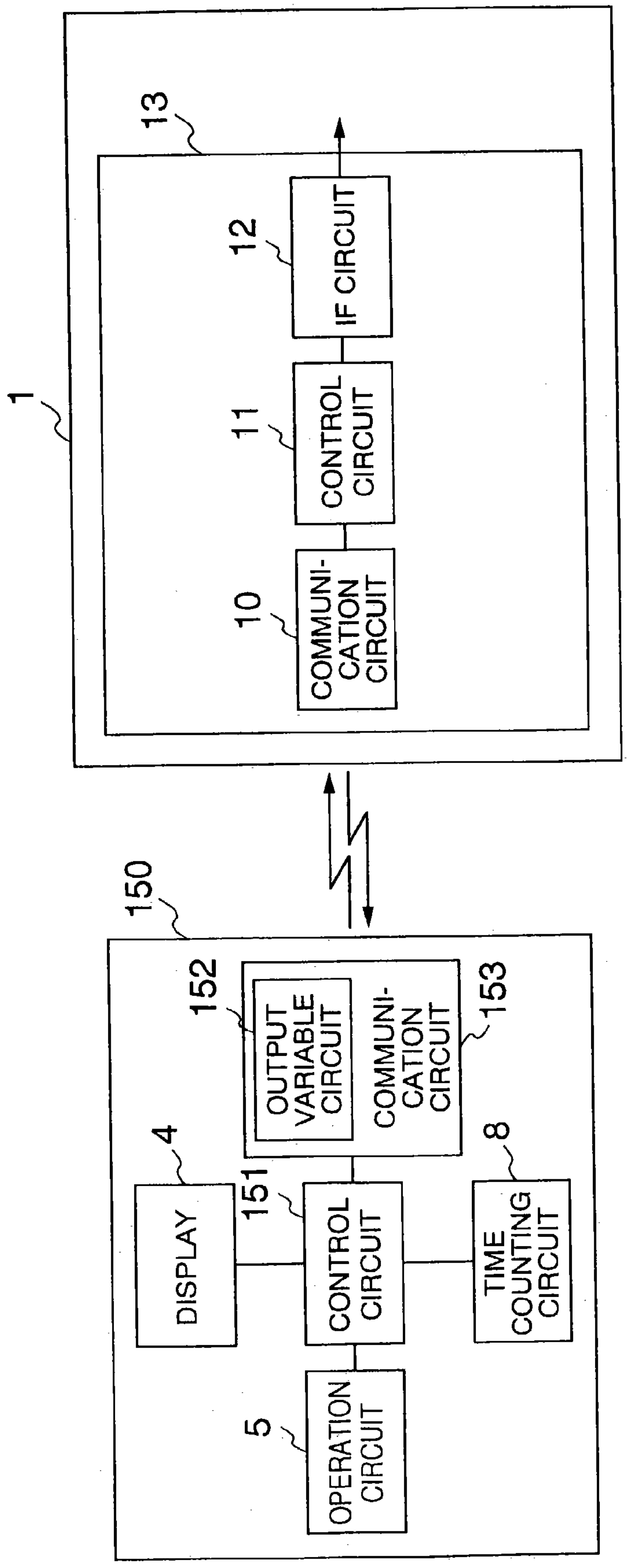
FIG. 17 is a block diagram showing still another embodiment of the present invention.

Next, still another embodiment of the present invention will be explained with reference to FIG. 17. This embodiment provides an automatic output remote keyless entry system having high safety by operating the system in a short range without releasing the door lock from a long distance when the terminal board 2 automatically outputs the door lock release signal, for example, in the automatic output mode. FIG. 17 is a block diagram showing the construction of each of the terminal board of the remote keyless entry system and its operation apparatus. In FIG. 17, reference numeral 150 denotes the terminal board, reference numeral 151 denotes the control circuit, reference numeral 152 denotes an output variable circuit and reference numeral 153 denotes the communication circuit.

The operation of FIG. 17 will be now explained. When the operation mode shifts to the automatic output mode, the control circuit 151 sends an output variable instruction to the output variable circuit 152 inside the communication circuit 152. The output variable circuit 152 executes the setting operation for lowering the output to a level lower than the output of its manual output operation in accordance with the output variable instruction from the control circuit 151. Next, the control circuit 151 sends the operation instruction signal to the communication circuit 153. The communication circuit 153 outputs in turn the operation instruction signal to the communication circuit 10 of the operation apparatus 13. At this time, the output variable circuit 152 lowers the output. The communication circuit 10 inside the operation apparatus 13 receives the operation instruction signal from the terminal board 150. Because the output of the signal from the terminal board 150 is lower at this time, however, the signal cannot be received reliably before the terminal board 150 comes close to the car 1. When the communication circuit 10 becomes capable of reliably receive the signal, it sends the operation instruction to the control circuit 11. Thereafter, the operation is carried out in the same way as in the embodiment shown in FIG. 2 and is then finished. According to this embodiment, the door lock cannot be released unless the operator comes close to the car. Therefore, this embodiment provides the effect of preventing the illegal door lock release from a remote place.

Figure 18:
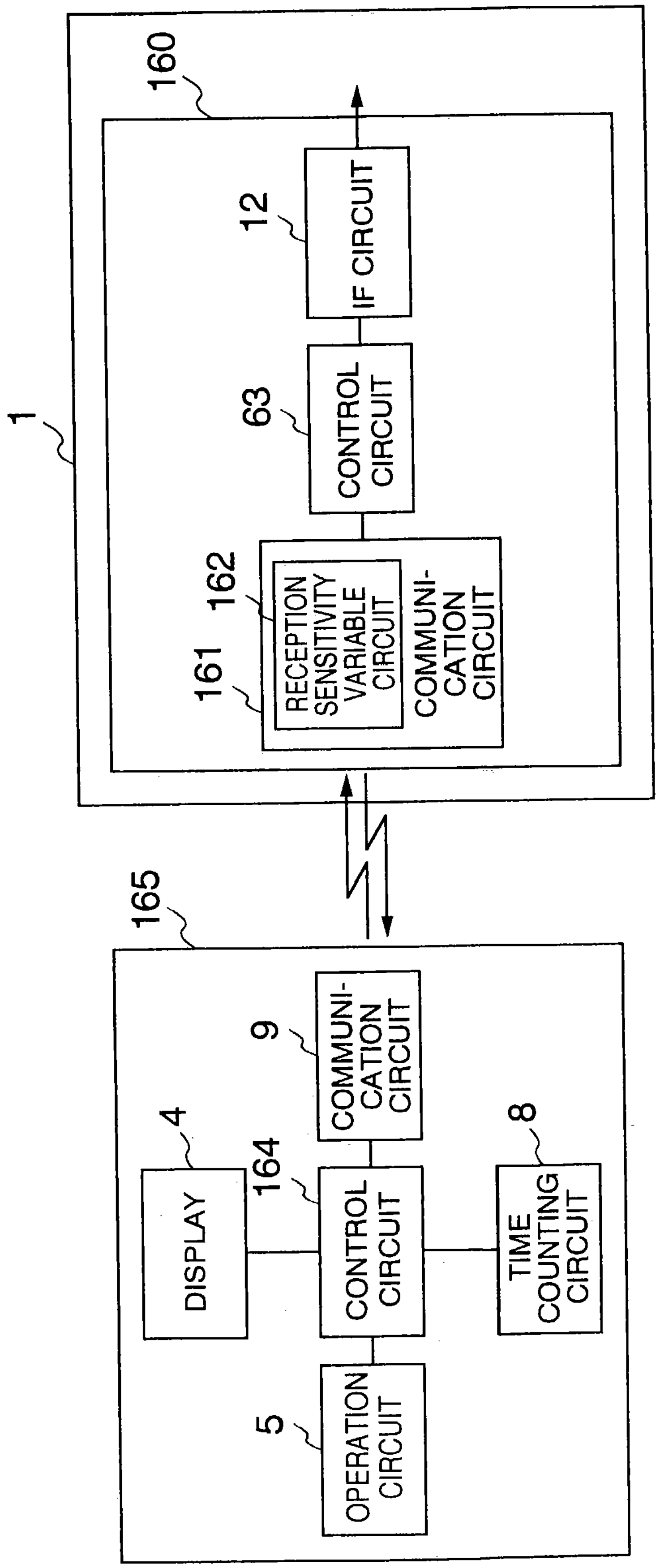
FIG. 18 is a block diagram showing still another embodiment of the present invention.

Still another embodiment of the present invention will be explained with reference to FIG. 18. The feature of the embodiment shown in FIG. 18 resides in that it lowers the reception sensitivity on the side of the operation apparatus and prevents its operation before the terminal board comes close to the car. In FIG. 18, reference numeral 160 denotes the operation apparatus, reference numeral 161 denotes the communication circuit, reference numeral 162 denotes the reception sensitivity variable circuit, reference numerals 163 and 164 denote the control circuits and reference numeral 165 denotes the terminal board.

The operation of FIG. 18 will be explained. The terminal board 165 outputs the operation instruction signal in the same way as the terminal board 2. It will be hereby assumed that the operation mode is set to the automatic output mode and the terminal board produces the automatic output. In this instance, the control circuit 164 sends the automatic output mode data representing that the operation mode is the automatic output mode, to the communication circuit 9 simultaneously with the output of the operation instruction signal. The communication circuit 9 sends the operation instruction signal and the automatic output mode data to the operation apparatus 160. The communication circuit 161 receives the operation instruction signal and the automatic output mode data and sends them to the control circuit 163. Receiving the automatic output mode data, the control circuit 163 sets the reception sensitivity variable circuit 162 inside the communication circuit 161 to a lower sensitivity.

The communication circuit 161 including the reception sensitivity variable circuit 162, which is thus set to a lower sensitivity, receives the operation instruction signal from the terminal board 165, and when it receives the operation instruction signal having an intensity higher the predetermined level which is set, the communication circuit 161 sends the operation instruction signal to the control circuit 163. Receiving the second operation instruction signal, the control circuit 163 sends the operation instruction for the car to the IF circuit 12.

Next, the operation end signal is sent to the communication circuit 161 and the sensitivity of the reception sensitivity variable circuit 162 is set to the original reception sensitivity. The communication circuit 161 outputs the operation end signal to the terminal board 165.

The terminal board 165 stops and releases the automatic output mode. According to this embodiment, the operation such as the door lock release is not effected unless the operator carrying the terminal board walks up to the car in the automatic output mode in the same way as in the embodiment shown in FIG. 17. Therefore, this embodiment is free from the problem that the door lock is released from a remote place.

Figure 19:
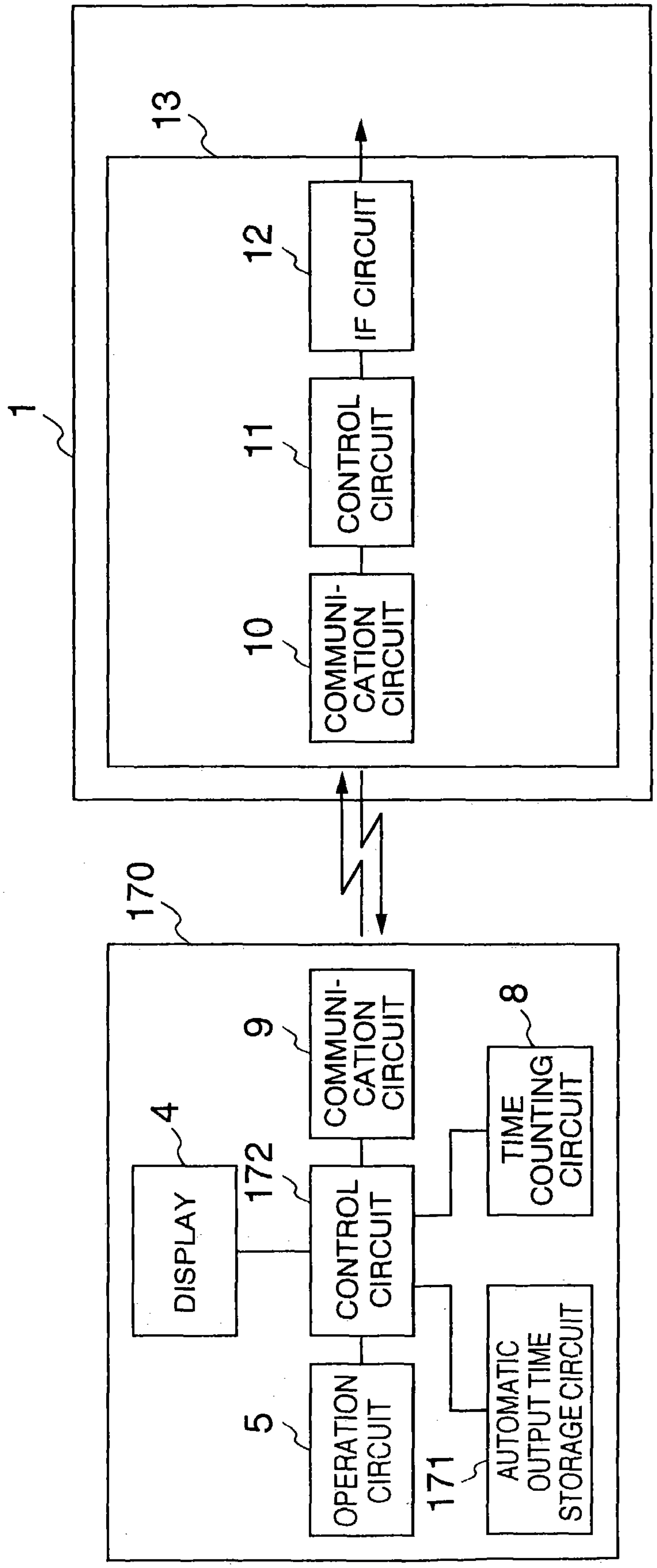
FIG. 19 is a block diagram showing still another embodiment of the present invention.

Next, still another embodiment of the present invention will be explained with reference to FIG. 19. The feature of this embodiment resides in that an automatic output time setting circuit is disposed so that the operator can select the output time of the automatic output mode. In FIG. 19, reference numeral 170 denotes the terminal board, reference numeral 171 denotes the automatic output time storage circuit and reference numeral 172 denotes the control circuit.

The operation of FIG. 19 will be explained. When the operator desires to set the operation mode to the automatic output mode, the operator pushes the mode switch button of the operation button 5 and sets the mode to the automatic output mode. Subsequently, the operator inputs the automatic output time of the automatic output mode. The input operation of the automatic output time may be decided by the push time of the operation button of the operation button 5, or by the number of times of the push operations.

Receiving the input from the operation button 5, the control circuit 7 causes the automatic output time storage circuit 171 to store the automatic output time data. At the same time, the control circuit 172 gives the time measurement start instruction to the time counting circuit 8. The time counting circuit 8 starts counting the time and sends the count result to the control circuit 172. The control circuit 172 compares the storage data of the automatic output time storage circuit 171 with the count data of the time counting circuit 8 and stops the automatic output when they coincide with each other. This embodiment provides the effect that battery consumption of the terminal board can be reduced when the operator does not approach the car after the operation mode is switched to the automatic output mode.

Figure 20B:
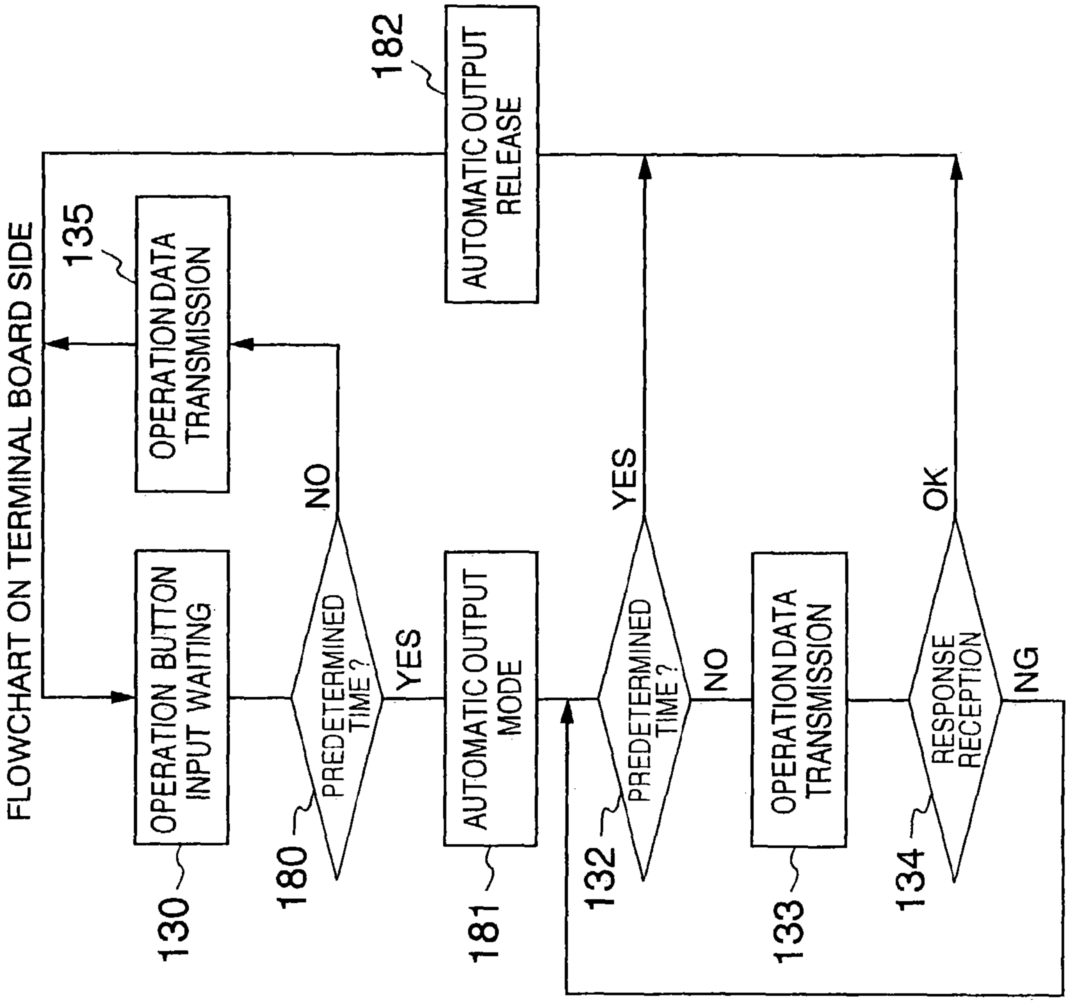
FIG. 20B is a flowchart, each being useful for explaining a mode setting method.
Figure 20A:
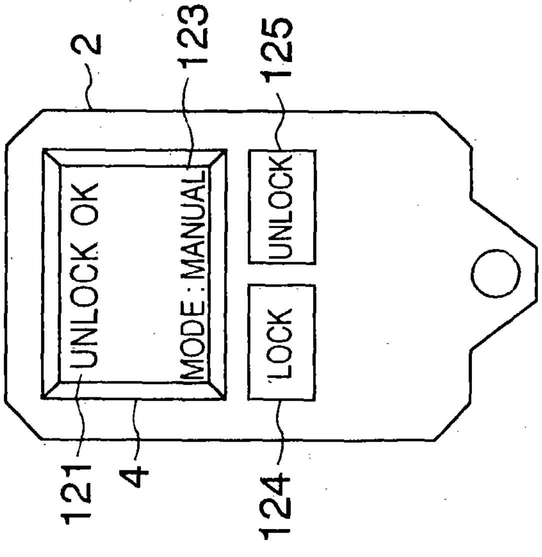
FIG. 20A is a schematic view showing the appearance of a terminal board.

Next, an example of the operation for continuously pushing the operation button so as to shift the operation mode to the automatic output mode, which has been explained in the embodiment shown in FIG. 19, will be explained with reference to FIGS. 20A and 20B. FIG. 20A is an appearance view showing the appearance of the terminal board which establishes the automatic output mode in accordance with the length of the push time of the operation button, and FIG. 20B is a flowchart showing the operation of the terminal board. In FIG. 20B, reference numeral 180 denotes a predetermined time detection branch process for executing a branch process depending on whether or not the continuous push time of the operation button reaches a predetermined time, reference numeral 181 denotes an automatic output mode shift process and reference numeral 182 denotes an automatic output mode release process.

The operation shown in FIG. 20B will be explained. Generally, the terminal board 2 is under the input waiting state in the operation button input waiting process 130.

When the operator pushes the door lock release button 125 of the terminal board 2, the process flow shifts to the predetermined time detection branch process 180. This predetermined time detection branch process 180 detects the length of the push time of the door lock release button. When the time is shorter than the predetermined time, the terminal board recognizes the command as the ordinary door lock release instruction and the operation flow shifts to the operation data transmission process 135.

When the push time of the door lock release button is longer than the predetermined time, the terminal board recognizes the command as the shift instruction to the automatic output mode, and the process flow shifts to the automatic output mode shift process 181. Thereafter, the automatic output is executed in the manner explained with reference to the flowchart of FIG. 15. When the terminal board receives the operation end signal from the operation apparatus side or executes the set time automatic output operation of the automatic output mode, the process flow shifts to the automatic output release process 182. After this automatic output mode release process 182, the process flow again shifts to the operation button input waiting process 130 and is on standby. A series of these operations can shift the operation mode to the automatic output mode depending on the length of the push time of the operation button.

Figure 21:
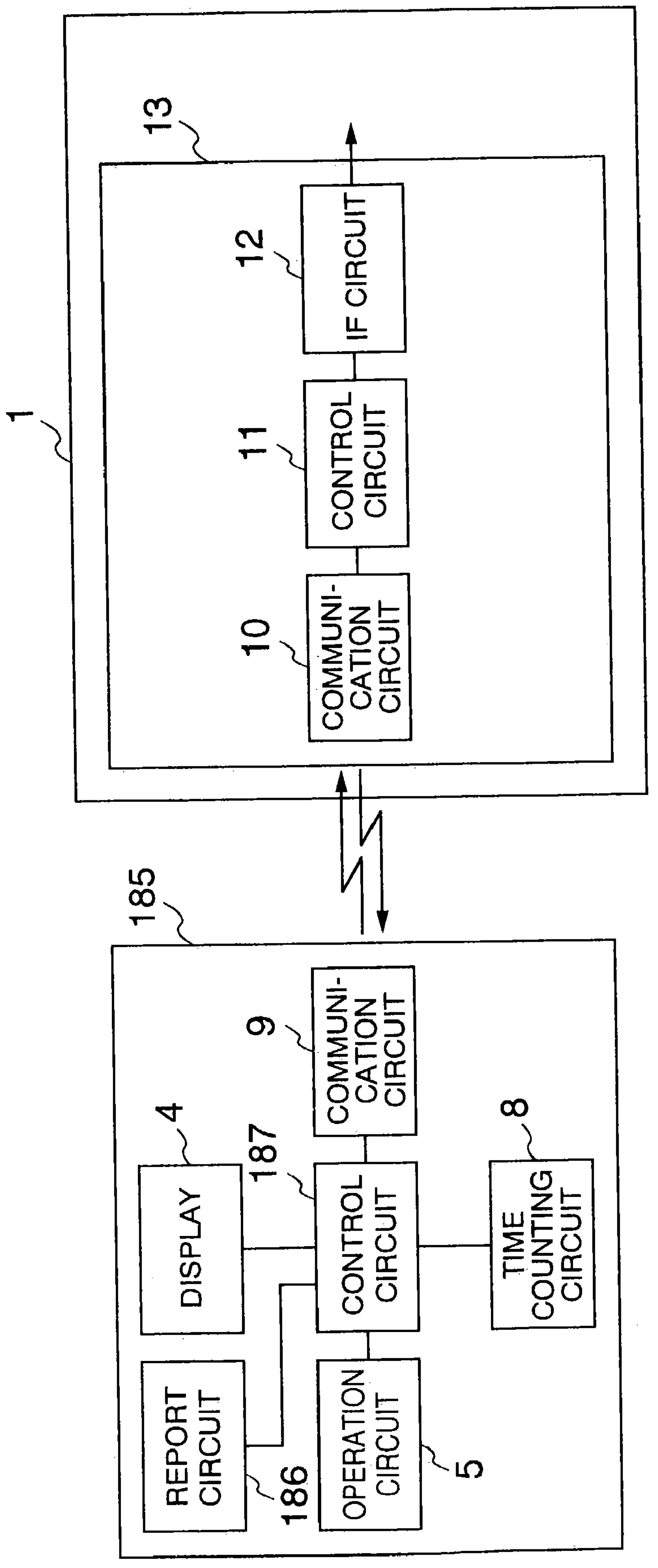
FIG. 21 is a block diagram showing still another embodiment of the present invention.

Next, still another embodiment of the present invention will be explained with reference to FIG. 21. The feature of the embodiment shown in FIG. 21 resides in that the operation apparatus reports the finish of the operation to the operator by vibration or sound through the terminal board while the automatic output operation is executed. FIG. 21 is a block diagram showing the construction of this embodiment. In FIG. 21, reference numeral 185 denotes the terminal board, reference numeral 186 denotes the report circuit and reference numeral 187 denotes the control circuit.

The operation of FIG. 21 will be explained. The operation till the operation end signal is transmitted from the operation apparatus 13 is the same as the operation explained with reference to FIG. 2. Therefore, its explanation will be omitted. The communication circuit 9 inside the terminal board 185 receives the operation end signal and sends it to the control circuit 187. The control circuit 187 sends the report instruction to the report circuit 186. The report circuit 186 comprises a vibration generation circuit or a sound generation circuit, or both of them, and reports to the operator by vibration or sound that the operation is completed. Due to the construction and operation described above, the operator can know the finish of the operation even when the operator keeps the terminal board in his pocket. Though the report circuit reports the finish of the operation in this explanation, the report may be made to the operator to the effect that the operation mode is the automatic output mode.

Figure 22:
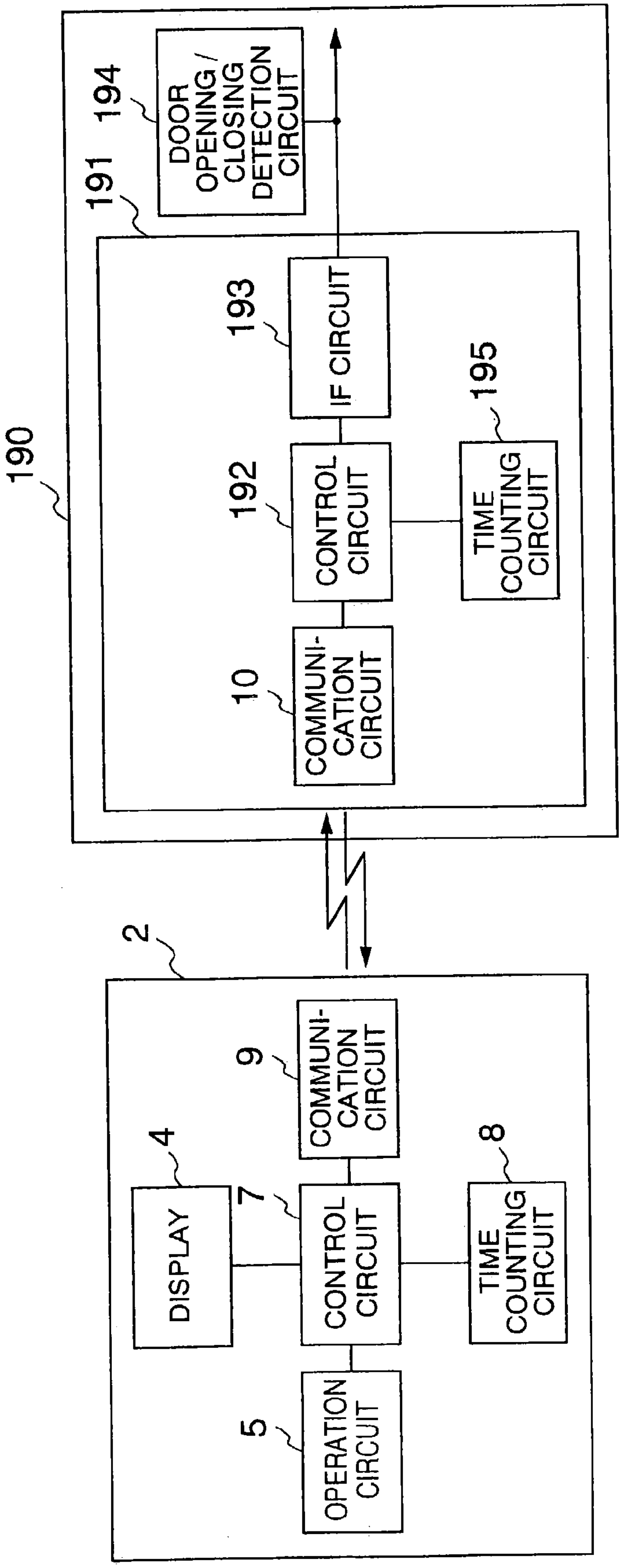
FIG. 22 is a block diagram showing still another embodiment of the present invention.

Still another embodiment of the present invention will be explained with reference to FIG. 22. The feature of this embodiment resides in that if the door or doors of the car are not operated for a time longer than a predetermined time after the door lock is released by the automatic output operation, the door lock operation is again executed. FIG. 22 is a block diagram showing the construction of this embodiment. In FIG. 22, reference numeral 190 denotes the car, reference numeral 191 denotes the operation apparatus, reference numeral 192 denotes the control circuit, reference numeral 193 denotes the IF circuit, reference numeral 194 denotes a door opening/closing detection circuit and reference numeral 195 denotes the time counting circuit.

The operation of FIG. 22 will be explained. The operation of the terminal board 2 in the automatic output operation is the same as that of the embodiment explained with reference to FIG. 2. The communication circuit 10 inside the operation apparatus 91 receives the door lock release signal and sends it to the control circuit 192. The control circuit 192 sends the door lock release instruction to the door lock actuator of the car 190 through the IF circuit 193 and sends also the count start instruction to the time counting circuit 195. The time counting circuit 195 starts counting and sends the count result to the control circuit 192.

On the other hand, the door opening/closing detection circuit 194 detects whether or not the door or doors are operated and sends the detection result to the control circuit 192 through the IF circuit 193. The control circuit 192 receives the count result from the time counting circuit 195 and when the door operation detection data is not sent from the door opening/closing circuit 194 even when a predetermined value is reached, it sends the door lock instruction to the door lock actuator through the IF circuit 193 and locks the door(s). Even when the door lock is released erroneously in the automatic output mode, the operation described above can lock the door(s) after the passage of the predetermined time to insure safety. According to the present invention described above, the operator sets by himself the operation mode to the automatic output mode. In consequence, the door lock is not released at unnecessary times. Because the time of the automatic output mode is short, power consumption is shorter than in the reference 2 that sets the time band. During the automatic output mode, the operation is not effected unless the operator and the car come close to each other. Therefore, the door lock is not released from a remote place and safety can be further insured.

Next, still another embodiment of the present invention for accomplishing a remote keyless entry system capable of confirming the time will be explained.

This embodiment, too, employs the system shown in FIGS. 1 and 2. In this embodiment, the display 4 displays the present time.

Referring back to FIG. 2, the time counting circuit 8 has also the function of a timepiece circuit. The time is set in advance to the timepiece circuit 8. The construction of the timepiece circuit 8 and its operation are well known, and its explanation will be omitted. The timepiece circuit 8 generates the time data (signal) and sends it to the control circuit 7. The control circuit 7 receives the time data, converts it to a time display signal for displaying the time on the display 4 and sends it to the display 4. The display 4 displays the time.

Next, the arrangement of the operation button and the display in the terminal board will be explained with reference to FIGS. 23A-23C.

Figure 23A:
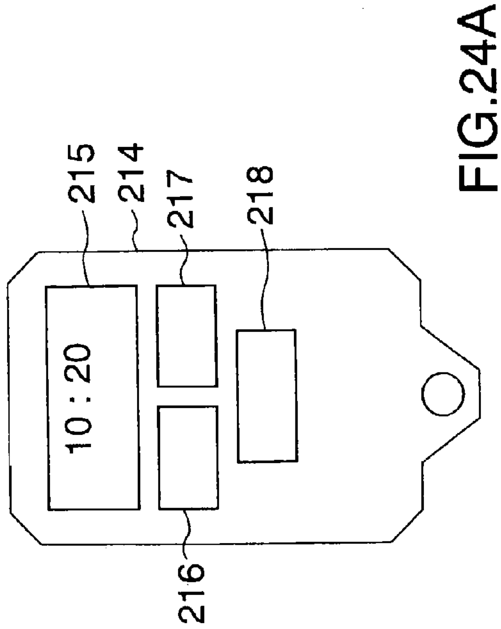
FIGS. 23A, 23B and 23C are front views showing examples of a terminal board used in a system according to the present invention.
Figure 23B:
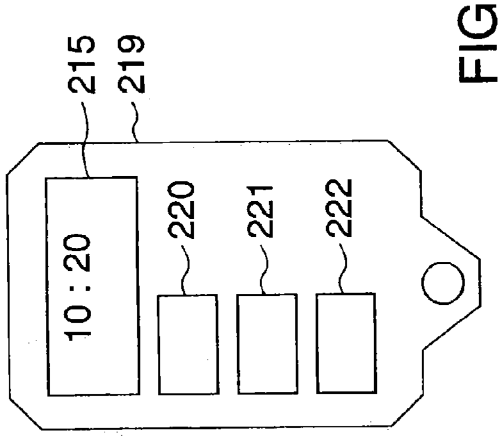
Figure 23C:
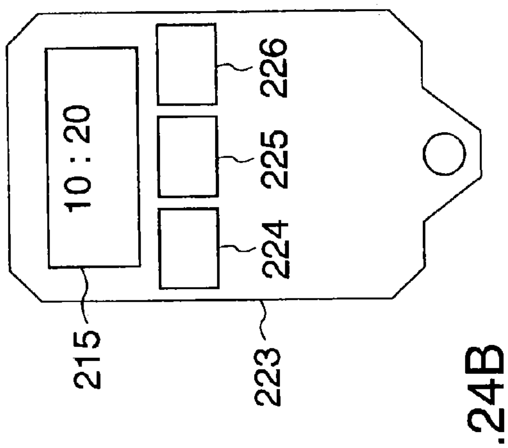

FIGS. 23A to 23C are front views showing other embodiments of the terminal board used in the system of the present invention. In the terminal board 214 shown in FIG. 23A, the operation buttons 216, 217 and 218 are shown disposed in two rows. In the terminal board 219 shown in FIG. 23B, the operation buttons 220, 221 and 222 are disposed in a single row in the longitudinal direction and in the terminal board 23 shown in FIG. 23C, the operation buttons 224, 225 and 226 are disposed in a single row in the transverse direction. In FIGS. 23A-23C, the operation buttons 216 to 218, 220 to 222 and 224 to 226 are switches, for example, and examples of this function include opening/closing of the doors, trunk opener, engine start, and so forth.

Because the operation buttons 216 to 218, 220 to 222 and 224 to 226 are disposed as shown in FIGS. 23A to 23C, the operator can discriminate the switches by the feel of touch. Therefore, even when the operator uses the terminal board in the dark, the erroneous operation can be prevented.

Another example of the display of the terminal board used for the system of the present invention, the construction of the operation button, and its arrangement, will be explained with reference to FIGS. 24A and 24B.

Figure 24A:
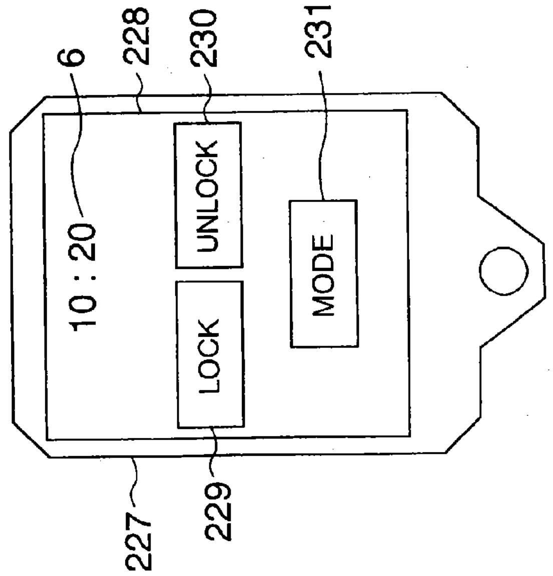
FIGS. 24A and 24B are front views showing other examples of the terminal board used in the system according to the present invention.
Figure 24B:
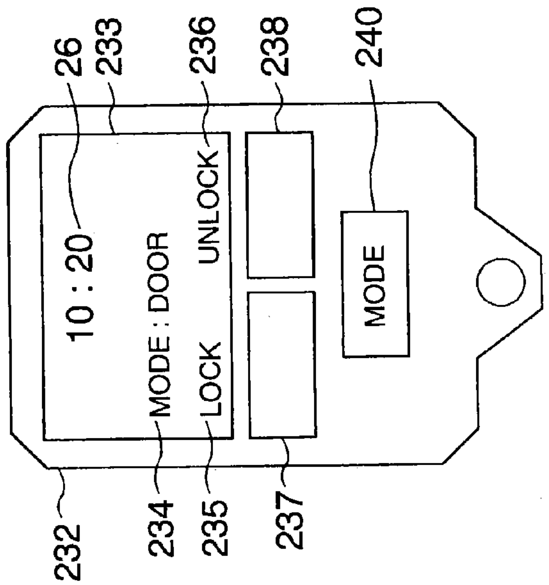

FIGS. 24A and 24B are front views each showing still another embodiment of the remote keyless entry system according to the present invention. In the terminal board 227 shown in FIG. 24A, each operation button 229 to 231 comprises a touch panel and is disposed on the display 228. In the terminal board 228 shown in FIG. 24B, a switch content display portion for displaying the content of the operation buttons 237 and 238 and a mode display portion 234 for displaying the mode, that is, the operation object, are disposed on the display 233. The operation buttons 237 and 238 are disposed at a lower part of the display 233, and execute the door lock/unlock operation of the car, for example. The operation button 240 is a switch for selecting the operation object, that is, the operation mode, and selects the operation object, in this case.

When the operation display 228 is turned on in the terminal board 27 employing the construction shown in FIG. 24A, the operation buttons 229, 230 and 231 are illuminated, too. Therefore, the erroneous operation of the operation buttons 229, 230 and 231 can be prevented even in a dark environment.

The operation buttons 229, 230 and 231 can be provided with various kinds of functions by enabling the operation button 231 to change over a plurality of operation modes and by changing the display of the operation buttons 229 and 230 in accordance with the switching operation.

In the construction shown in FIG. 24B, too, many kinds of functions can be allocated to the operation buttons 237 and 238 by similarly changing over the operation mode by pushing the operation button 240.

Figure 25A:
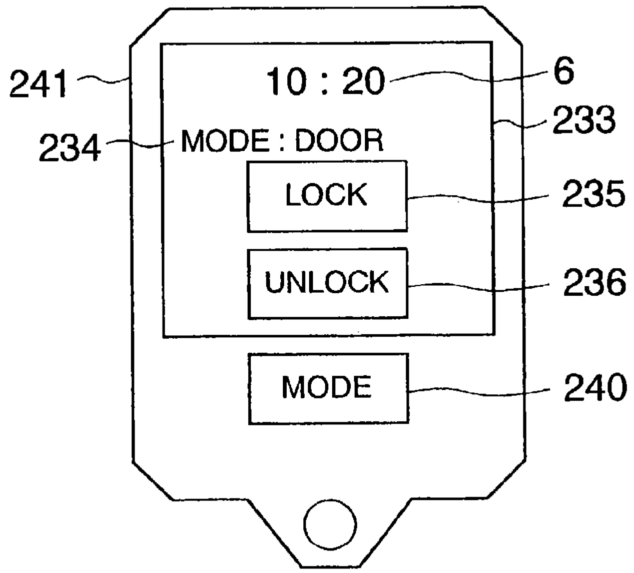
FIGS. 25A and 25B are front and back views, respectively, showing another example of the terminal board used in the system according to the present invention.
Figure 25B:
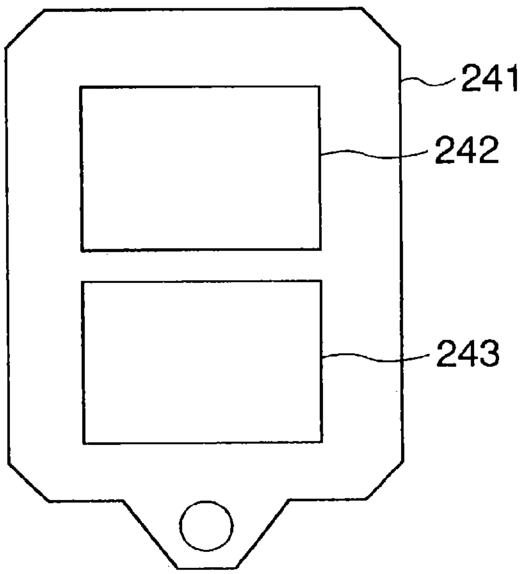

Next, a terminal board having a part of the operation buttons disposed on the back thereof will be explained with reference to FIG. 25. In FIG. 25, (a) is a front view showing still another example of the terminal board used in the present system and (b) in FIG. 25 is its back view. In FIG. 25, only a switch 240 is disposed on the surface of the terminal board 241 while switches 237 and 238 are disposed on the back of the terminal board 241. In FIG. 25, further, like reference numerals are used to identify like constituent members exhibiting like functions as in FIGS. 1 to 24.

When the operation buttons that are frequently used are disposed on the back, the operator can confirm the location of the operation buttons (switches) 237 and 238 by the feel of touch. Therefore, the operator can operate the terminal board more easily without the erroneous operation.

Because the scale of the operation buttons 237 and 238 can be increased, the terminal board can be operated more easily.

Figure 26A:
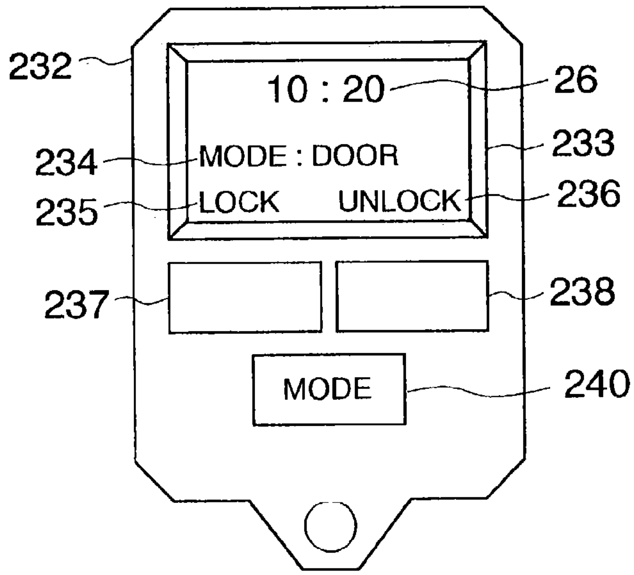
FIGS. 26A and 26B are front and side views, respectively, of still another example of the terminal board used in the system according to the present invention.
Figure 26B:
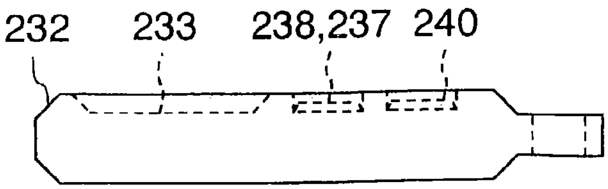

The construction of the terminal board will be then explained with reference to FIG. 26. In FIG. 26, (a) is a front view showing still another embodiment of the terminal board used for the remote keyless entry system according to the present invention and in FIG. 26, (b) is its side view. As can be seen clearly from (b) in FIG. 26, the display 233 of the terminal board 232 is recessed from the exterior surface while the operation buttons 237, 238 and 240 are disposed at the same level as, or a lower level than, the exterior surface. The operation of this terminal board is the same as that of the terminal board 232 shown in FIG. 24B. The driver generally carries the terminal board in his pocket or bag. If any protuberance portion exists, therefore, the erroneous operation or damage of the terminal board is likely to occur. In the terminal board 232 according to this embodiment, the surface of the display 233 is lower than the level of the exterior surface and for this reason, the display 233 becomes more difficult to be damaged. Because the operation switches 237, 238 and 240 are disposed at positions equal to, or lower than, the exterior surface as shown in (b) of FIG. 26, erroneous transmission while the operator carries the terminal board can be prevented.

Figure 27:
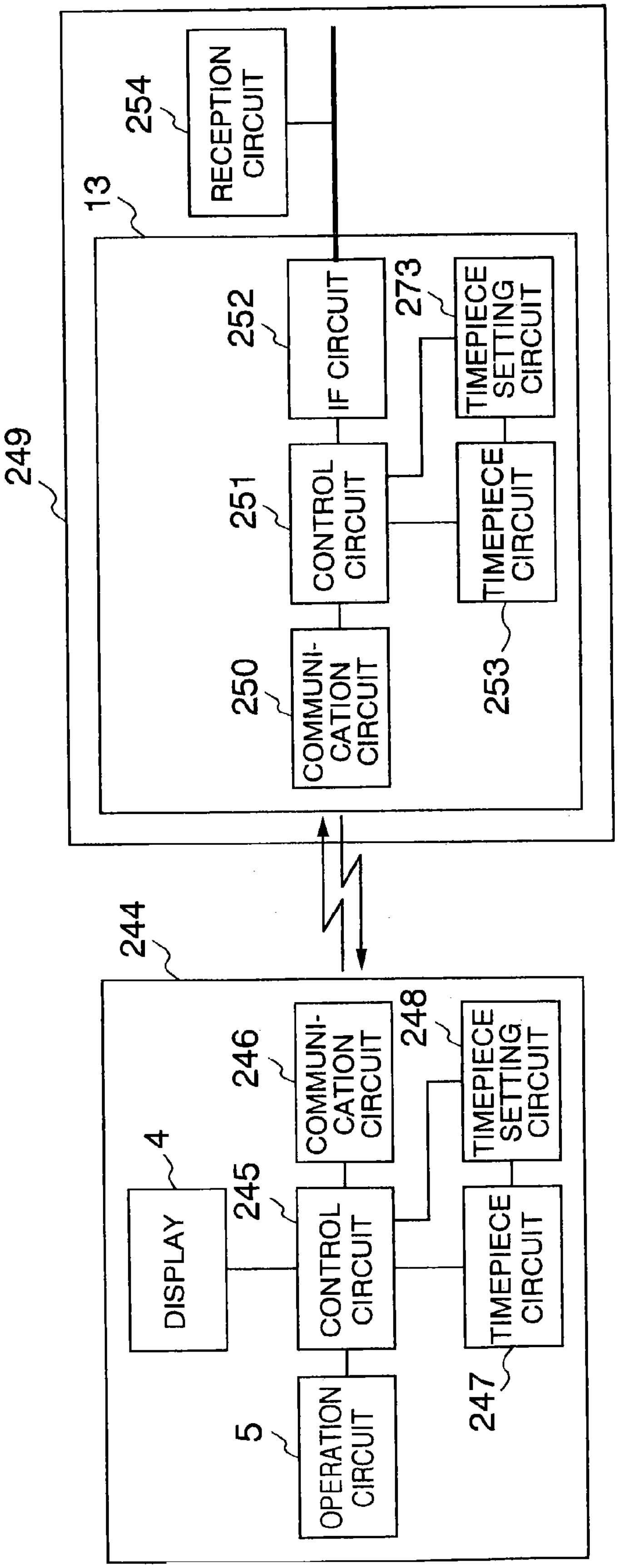
FIG. 27 is a block diagram showing a remote keyless entry system according to still another embodiment of the present invention.

Next, still another embodiment of the remote keyless entry system according to the present invention will be explained with reference to FIG. 27. FIG. 27 is a block diagram showing the remote keyless entry system of this embodiment. Referring to FIG. 27, the terminal board 244 is furnished with the control circuit 245, the communication circuit 246, the timepiece circuit 247 and the timepiece setting circuit 248. This terminal board 244 can be applied to the terminal boards shown in FIGS. 23 to 26. In FIG. 27, further, the car 249 on the operation side is furnished with the communication circuit 250, the control circuit 251, the timepiece circuit 253, the timepiece setting circuit 273, the IF circuit 252 and the reception circuit 254.

Hereinafter, the operation of FIG. 27 will be explained. The reception circuit 254 receives the time casting of radio or television broadcasting and sends the time data to the control circuit 251 through the IF circuit 252. The control circuit 241 sets the timepiece circuit 253 to the correct time through the timepiece setting circuit 273. At the same time, the control circuit 251 sends the time data to the communication circuit 250. The communication circuit 250 sends in turn the time data to the communication circuit 246 of the terminal board 244. The communication circuit 246 sends further the time data to the control circuit 245. The control circuit 245 sets the timepiece circuit 247 to the correct time through the timepiece setting circuit 248. Incidentally, even when the time data from the car 249 does not arrive, the time of the timepiece circuit 247 can be adjusted by this timepiece setting circuit 248.

According to this embodiment, the timepiece circuits 247 and 253 can always keep the correct time. The explanation of the operation given above deals with the case where the time data is transferred to the terminal board 244 whenever the reception circuit receives the time casting, but the similar effect can be obtained by transferring the time data of the timepiece circuit 253 to the terminal board 244 through the control circuit 251 and through the communication circuit 250 and by setting the timepiece circuit 247 by the timepiece setting circuit 248 whenever the terminal board 244 transfers the operation instruction to the operation apparatus 213.

Figure 28:
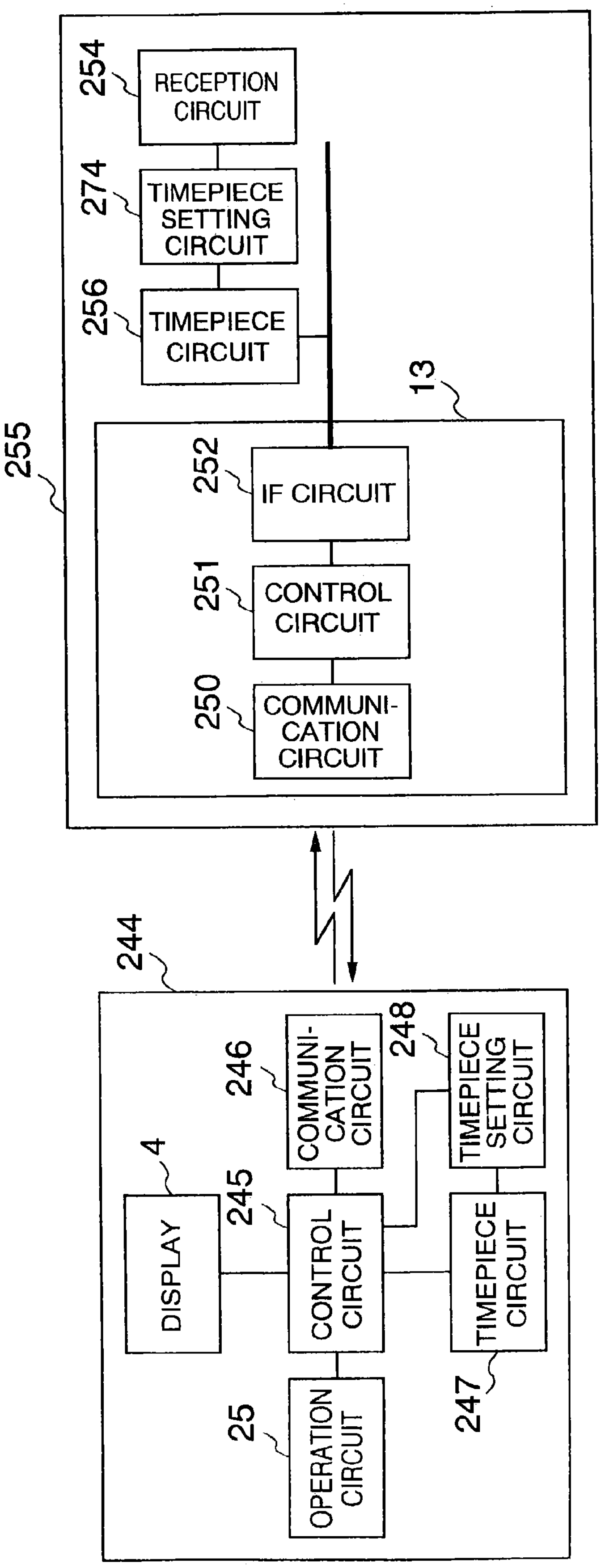
FIG. 28 is a block diagram showing a remote keyless entry system according to still another embodiment of the present invention.

The remote keyless entry system according to still another embodiment of the present invention will be explained with reference to FIG. 28. FIG. 28 is a block diagram showing the remote keyless entry system according to this embodiment. In this embodiment, the timepiece circuit 256 and the timepiece setting circuit 247 are provided to the to-be-controlled apparatus, that is, the operation apparatus 13 inside the car 255, in this case. The timepiece setting circuit 274 sets the timepiece circuit 256 to the correct time by the time data from the reception circuit 254. Thereafter, the timepiece circuit 247 on the side of the terminal board 244 is set in the same way as in the operation explained with reference to FIG. 27.

When the timepiece circuit 256 mounted to the car 255 is utilized without disposing the timepiece circuit in the operation apparatus 13, the timepiece circuit need not be disposed overlappingly inside the same car, and the timepiece circuit 56 mounted to the car 255 can keep the correct time.

Figure 29:
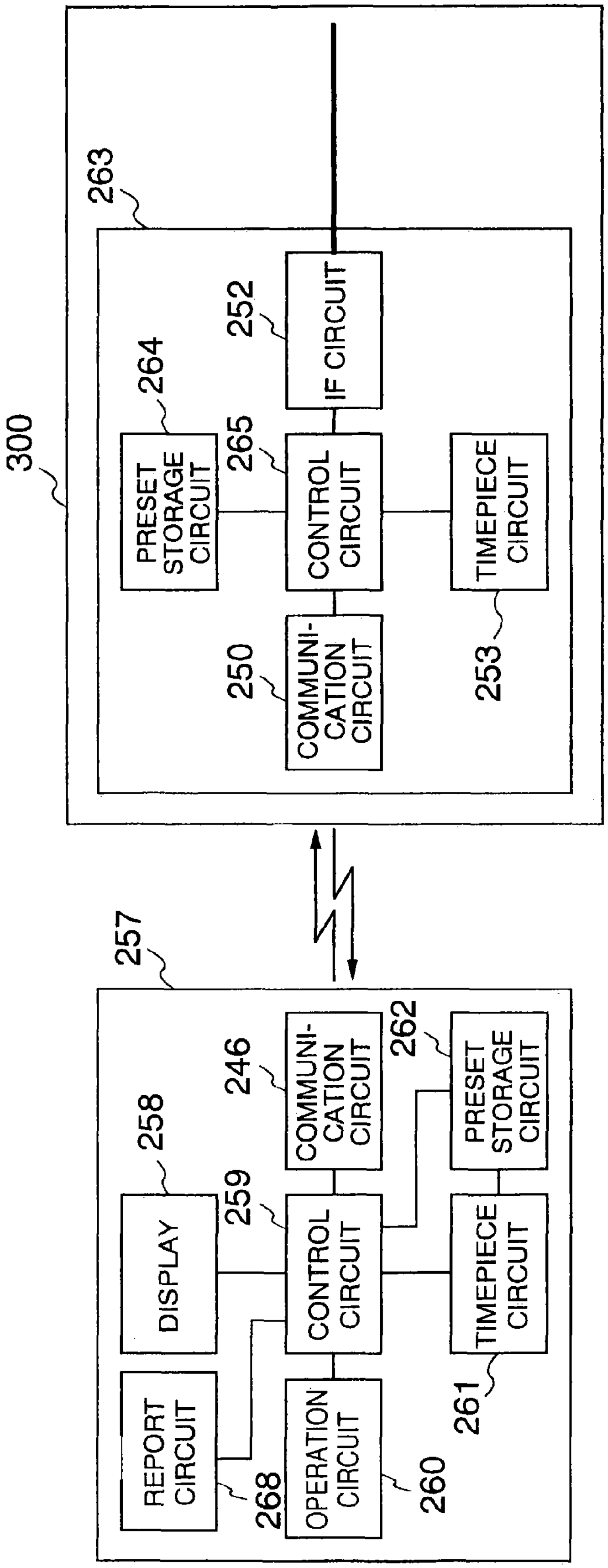
FIG. 29 is a block diagram showing a remote keyless entry system according to still another embodiment of the present invention.

A remote keyless entry system according to still another embodiment of the present invention will be explained with reference to FIG. 29. FIG. 29 is a block diagram showing the remote keyless entry system according to this embodiment. In this embodiment, a preset storage circuit is provided to store the operation instruction so that the operation can be made at the set time.

In FIG. 29, the display 258, the control circuit 259, the operation button 260, the preset storage circuit 262 and the report circuit 268 are provided to the terminal board 257, whereas the control circuit 26 and the preset storage circuit 264 are provided to the operation apparatus 263. Reference numeral 300 denotes the car.

Referring to this drawing, the operator (the driver, for example) inputs the operation instruction and the operation time from the operation button 260. The operation instruction includes, for example, an instruction to start the engine at the set time, an instruction to start the air conditioner, an instruction to open a garage door, an instruction to open or close the car door(s), and so forth. The operation button 250 sends the operation instruction and the operation time to the control circuit 259. The control circuit 259 sends the operation instruction and the operation time to the preset storage circuit 262. The preset storage circuit 262 stores the operation instruction and the operation time. The control circuit 259 sends the operation instruction and the operation time to the operation apparatus 263 through the communication circuit 246.

The communication circuit 250 in the operation apparatus 263 receives the operation instruction and the operation time and sends them to the control circuit 260. The control circuit 265 sends the operation instruction and the operation time to the preset storage circuit 264, and the preset storage circuit 264 stores the operation instruction and the operation time. The control circuit 265 compares the present time of the timepiece circuit 253 with the operation time of the preset storage circuit 264, and outputs the set operation instruction to the internal communication network inside the car 300 through the IF circuit 252 at the point when the present time reaches the set operation time.

Further, the control circuit 259 compares the present time of the timepiece circuit 261 with the operation time of the preset storage circuit 262 and at the point when the present time reaches the set operation time, the control circuit 259 transfers to the report circuit 268 the data representing that the time is now the start time of the set operation.

The report circuit 268 reports to the user (driver) that the set operation time is reached. The method of reporting may use sound or vibration. At the same time, the operation content may be displayed on the display 258.

In the explanation given above, the terminal board 257 gives the report the arrival of the operation time to the report circuit 268 by using the preset storage circuit 262 and the timepiece circuit 261 inside the operation apparatus 257. However, it is also possible to employ the construction in which the car 65 returns the report of the execution of the operation to the operation apparatus 263 through the internal communication network, the operation apparatus 263 returns the signal representing the execution of the operation to the terminal board 257, and the report circuit 268 gives the report to the user or displays it on the display. When the car 300 exists close to the terminal board 257 to a certain extent and is within the communicable range, it is possible to transfer the operation result to the terminal board 257 and when the car is out of the communicable range, it is possible to give the report to the user by the terminal board 257 alone.

Figure 30A:
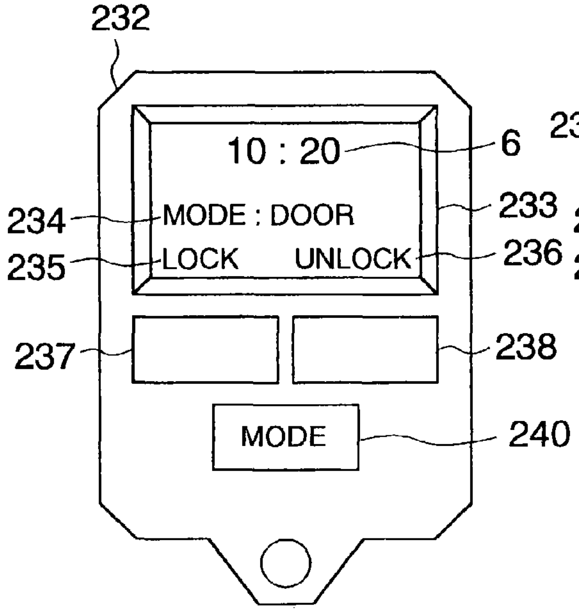
FIG. 30A is a front view of a terminal board used in the system.
Figure 30B:
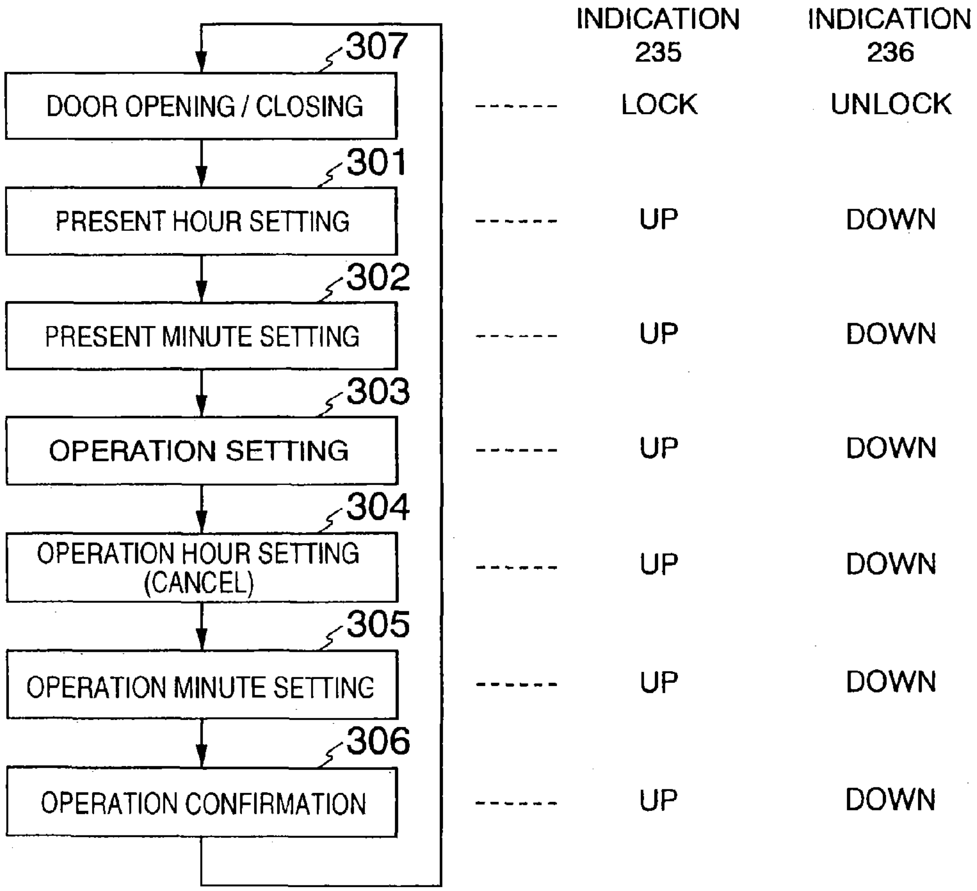
FIG. 30B is a flowchart of a remote keyless entry system according to the present invention.

Next, an example of the method of setting the operation time, etc, will be explained with reference to FIGS. 30A and 30B. FIG. 30A is a front view of the terminal board and FIG. 30B is a flowchart showing the operation sequence of the remote keyless entry system using the terminal board shown in FIG. 30A. The operation mode of opening the car door will be explained by way of example with reference to FIG. 30B. As shown in FIG. 30B, this operation mode proceeds in the sequence of door opening/closing, hour setting of the present time, minute setting of the present time, operation setting, hour setting of the operation time (inclusive of release), minute setting of the operation time and operation confirmation. These modes are switched by the operation button 40 shown in FIG. 30A. The content and function of the operation buttons 237 and 238 are switched as indicated by the content display portions 235 and 236.

When the operation button 240 is pushed, the modes corresponding to the engine, the window, the air conditioner, etc, are displayed on the operation object display portion 234 of the display 233. FIG. 30A shows the door mode. When this operation button 240 switches the mode, the content corresponding to the mode such as ON/OFF in the case of the engine, open/close or LOCK/UNLOCK in the case of the window and ON/OFF in the case of the air conditioner, etc, are displayed on the content display portions 235 and 236.

When the door is opened at the set operation time, the present hour is set by the operation apparatus 22 in step 301 in FIG. 30B and the present minute is set in step 302. The operation mode is set by the operation button 240 in step 303 and is displayed on the mode display portion 234. This embodiment sets the door. Further, LOCK (close) or UNLOCK (open) of the door is selected by the operation button. The set operation time that has so far been inputted is released in step 304 and the hour to be set once again is inputted. In step 305, the present minute is set. The operation flow then shifts to step 306 and the reserved content is displayed automatically. Therefore, the content can be confirmed. When the reserved time is reached, the operation flow shifts to step 307 and the door opening or closing operation is carried out. When the setting method described above is employed, a greater number of functions can be provided to the terminal board.

Figure 31:
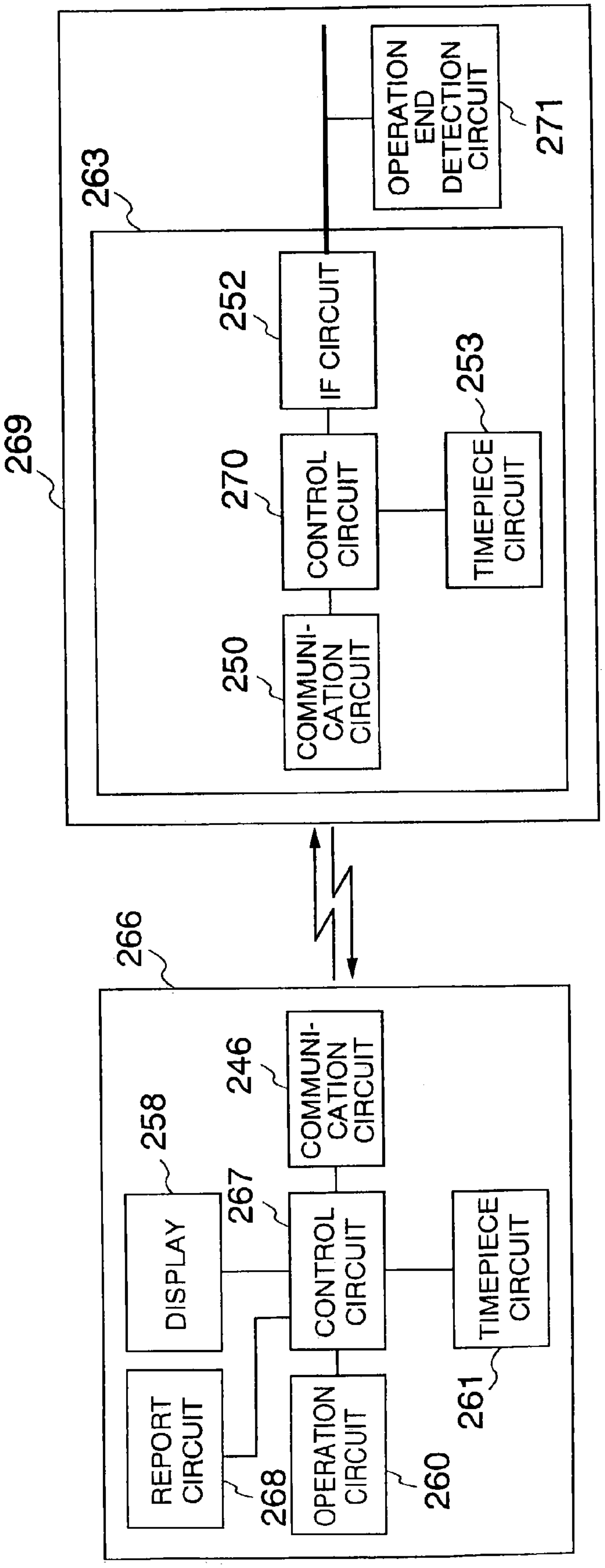
FIG. 31 is a block diagram showing a remote keyless entry system according to still another embodiment of the present invention.

A remote keyless entry system according to still another embodiment of the present invention will be explained with reference to FIG. 31. FIG. 31 is a block diagram of this embodiment. In the embodiment shown in FIG. 31, too, the car 269 operates upon receiving the operation instruction of the terminal board 266. The operation result is detected and is returned to the terminal board 66 to report to the user. The operation instruction is sent to the internal communication network of the car 269 through the control circuit 267, the communication circuits 246 and 250, the control circuit 270 and the IF circuit 252 of the terminal board 266. Completion of the operation is detected by the operation finish detection circuit 271 and the operation end signal is outputted to the report circuit 268 through the IF circuit 252, the control circuit 270, the communication circuits 250 and 246 and the control circuit 267. Completion of the operation is reported by sound or vibration, for example.

In this embodiment, a door lock detection circuit and an engine operation detection circuit are disposed as the operation finish detection circuit 271. When the door is not locked after the passage of a predetermined time from the stop of the engine, the operation apparatus 269 transfers a door lock alarm data to the terminal board 266 and the door lock alarm can thus be outputted to the display 258 or the report circuit 268 of the terminal board 266.

This embodiment provides the effect that the user can reliably confirm that the operation is reliably executed.

Figure 32:
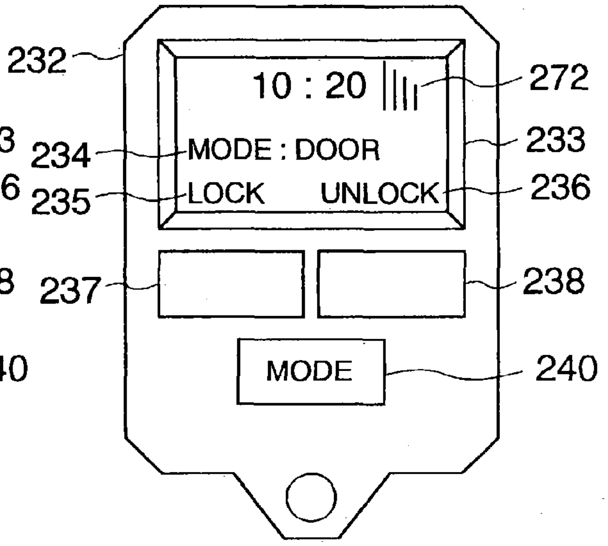
FIG. 32 is a front view showing still another example of a terminal board used in a system according to the present invention.

Next, still another example of the terminal board of the present invention will be explained with reference to FIG. 32. FIG. 32 is a front view showing the terminal board used for the remote keyless entry system according to the present invention. The terminal board in this embodiment includes the display for displaying whether or not the terminal board and the car are within the communicable range so that the operator can confirm the communicable range. In FIG. 32, reference numeral 72 denotes a communication intensity display portion for displaying the intensity of communication from the operation apparatus on the car side. Since the method of detecting the intensity is well known in the field of ordinary communication such as cellular telephone, its explanation will be omitted.

Though all the foregoing embodiments have been described about the car, the remote keyless entry system according to the present invention can be applied to opening/closing of a garage door, to operation setting of air conditioners of houses, and so forth.

As described above, the time display can be made on the side of the terminal board of the remote keyless entry system. Therefore, the present invention provides the effect that the time can be confirmed, whenever necessary. Further, the present invention provides the effect that the operation can be started at the set time and can be confirmed.

Any one of the circuit blocks in above-mentioned embodiments may be replaced by the software program providing a same result of the respective circuit block and executed by a computer.

While several embodiments of the present invention have thus been shown and described, it should be understood that various changes and modifications could be made without departing from the spirit or scope of the following claims.

What is claimed is:

1. A remote keyless entry system for operating an operation apparatus by remote operation of a terminal apparatus, said terminal apparatus comprising:

a 2-way communication unit that carries out 2-way communication at at least one data rate;

a 1-way communication unit that carries out 1-way communication at a certain data rate lower than a lowest data rate in said 2-way communication unit; and a control unit for controlling said 2-way communication unit and said 1-way communication unit to transmit either one of signals from said 2-communication unit and said 1-communication unit, and said operation apparatus comprising a communication device for receiving the signal transmitted from said terminal apparatus and transmitting a response signal to said terminal apparatus when the received signal is 2-communication signal.

2. A remote keyless entry system according to claim 1, wherein said 2-communication unit is capable of carrying out the 2-way communication at one of a plurality of different data rates, said control unit controls said 2-communication unit to choose one of said plurality of different data rates, and when a valid 2-communication is not established at a lowest data rate in said plurality of different data rates, said 1-way communication unit is controlled to transmit the data from said terminal board by 1-communication at a lower data rate than said lowest data rate in the 2-communication.

3. A remote keyless entry system according to claim 1, wherein said control unit previously chooses either one of the 1-way communication and the 2-communication using a data rate higher than a data rate in said 1-communication.

4. A remote keyless entry system according to claim 1, wherein said terminal apparatus includes a report unit for indicating the 1-way communication operation when the 1-communication is carried out.

5. A remote keyless entry system according to claim 2, wherein said control unit controls said 2-communication unit to gradually change the data rate from the highest data rate to the lowest data rate.

6. A remote keyless entry system according to claim 1, wherein said terminal apparatus includes a report unit for indicating either one of said 1-communication and said 2-communication.

7. A remote keyless entry system according to claim 6, wherein said report unit is a lighting device.

8. A remote keyless entry system according to claim 6, wherein said report unit is a display device.

9. A remote keyless entry system according to claim 8, wherein said display device is an indicator.

10. A remote keyless entry system according to claim 1, wherein said terminal apparatus includes an instruction storage unit for storing operation process of either one of the 1-communication and the 2-way communication.

11. A remote keyless entry system according to claim 10, wherein said terminal apparatus includes an instruction confirmation operation unit for reading out and displaying stored contents of said instruction storage unit.

* * * * *